United States Patent
Saitoh et al.

(10) Patent No.: US 9,036,193 B2
(45) Date of Patent: May 19, 2015

(54) IMAGE FORMING APPARATUS AND METHOD OF CONTROLLING RESOURCES IN THE IMAGE FORMING APPARATUS

(71) Applicants: Yuuta Saitoh, Tokyo (JP); Hidenori Shindo, Tokyo (JP)

(72) Inventors: Yuuta Saitoh, Tokyo (JP); Hidenori Shindo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/161,810

(22) Filed: Jan. 23, 2014

(65) Prior Publication Data

US 2014/0247462 A1 Sep. 4, 2014

(30) Foreign Application Priority Data

Mar. 4, 2013 (JP) ................. 2013-042264

(51) Int. Cl.
*G06F 3/12* (2006.01)
*G06F 9/50* (2006.01)
*H04N 1/00* (2006.01)

(52) U.S. Cl.
CPC .............. *G06F 9/50* (2013.01); *H04N 1/00954* (2013.01); *H04N 2201/0094* (2013.01)

(58) Field of Classification Search
None
See application file for complete search history.

(56) References Cited

U.S. PATENT DOCUMENTS

| 7,509,452 B2 | 3/2009 | Hattori et al. | |
| 7,898,678 B2 * | 3/2011 | Luciano et al. | 358/1.15 |
| 2002/0093675 A1 * | 7/2002 | Matsuda | 358/1.15 |
| 2003/0202209 A1 * | 10/2003 | Mellor et al. | 358/1.16 |
| 2009/0237726 A1 * | 9/2009 | Fujisawa | 358/1.15 |

FOREIGN PATENT DOCUMENTS

JP 2005-202890 7/2005

* cited by examiner

*Primary Examiner* — Jeremiah Bryar
(74) *Attorney, Agent, or Firm* — Harness, Dickey & Pierce, P.L.C.

(57) ABSTRACT

An image forming apparatus includes a resource management part that manages, as a plurality of resources, image data to be used by a plurality of processes concerning a module in the image forming apparatus or a storage area that stores the image data, and one or more units of hardware; and an exclusive control part that, in a case where at least one resource of the plurality of resources is used, carries out exclusive control of the at least one resource, and stops or finishes exclusive control of the module.

12 Claims, 24 Drawing Sheets

IMAGE FORMING APPARATUS AND METHOD OF CONTROLLING RESOURCES IN THE IMAGE FORMING APPARATUS

BACKGROUND OF THE INVENTION

1. Field of the Invention

The present invention relates to an image forming apparatus and a method of controlling the same.

2. Description of the Related Art

In the related art, a MultiFunction Peripheral (MFP) is known which includes respective functions as a facsimile machine, a printer, a copying machine, a scanner and so forth. In such a MFP, a processing speed is increased, and also, a time required for transferring image data is increased due to implementation of high resolution and implementation of high gradation. Therefore, it is important to handle and process information in a management area at high speed. Japanese Laid-Open Patent Application No. 2005-202890 (Patent Document No. 1) discloses an image forming apparatus and a hard disk management method for preventing inconsistency in data otherwise occurring due to power discontinuity or the like and maintaining consistency in data stored in a hard disk.

SUMMARY OF THE INVENTION

According to one aspect of the present invention, an image forming apparatus includes a resource management part that manages, as a plurality of resources, image data to be used by a plurality of processes concerning a module in the image forming apparatus or a storage area that stores the image data, and one or more units of hardware; and an exclusive control part that, in a case where at least one resource of the plurality of resources is used, carries out exclusive control of the at least one resource, and stops or finishes exclusive control of the module.

Other objects, features and advantages of the present invention will become more apparent from the following detailed description when read in conjunction with the accompanying drawings.

DETAILED DESCRIPTION OF THE EMBODIMENTS

First, for the sake of convenience of explanation, a problem to be solved by the embodiments will be described.

In the above-mentioned art disclosed by Patent Document No. 1, exclusive control is carried out while attaching importance to consistency in data, and it is not possible to interrupt a process concerning exclusive control for another process.

The embodiments according to the present invention have been devised in consideration of the above-mentioned problem, and an objective is to provide an image forming apparatus in which it is possible to reduce a delay occurring due to exclusive control.

In the embodiments of the present invention, it is possible to provide image forming apparatuses in which it is possible to reduce a delay occurring due to exclusive control.

Below, the embodiments of the present invention will be described with reference to the accompanying drawings.

<System Configuration>

Figure 1:
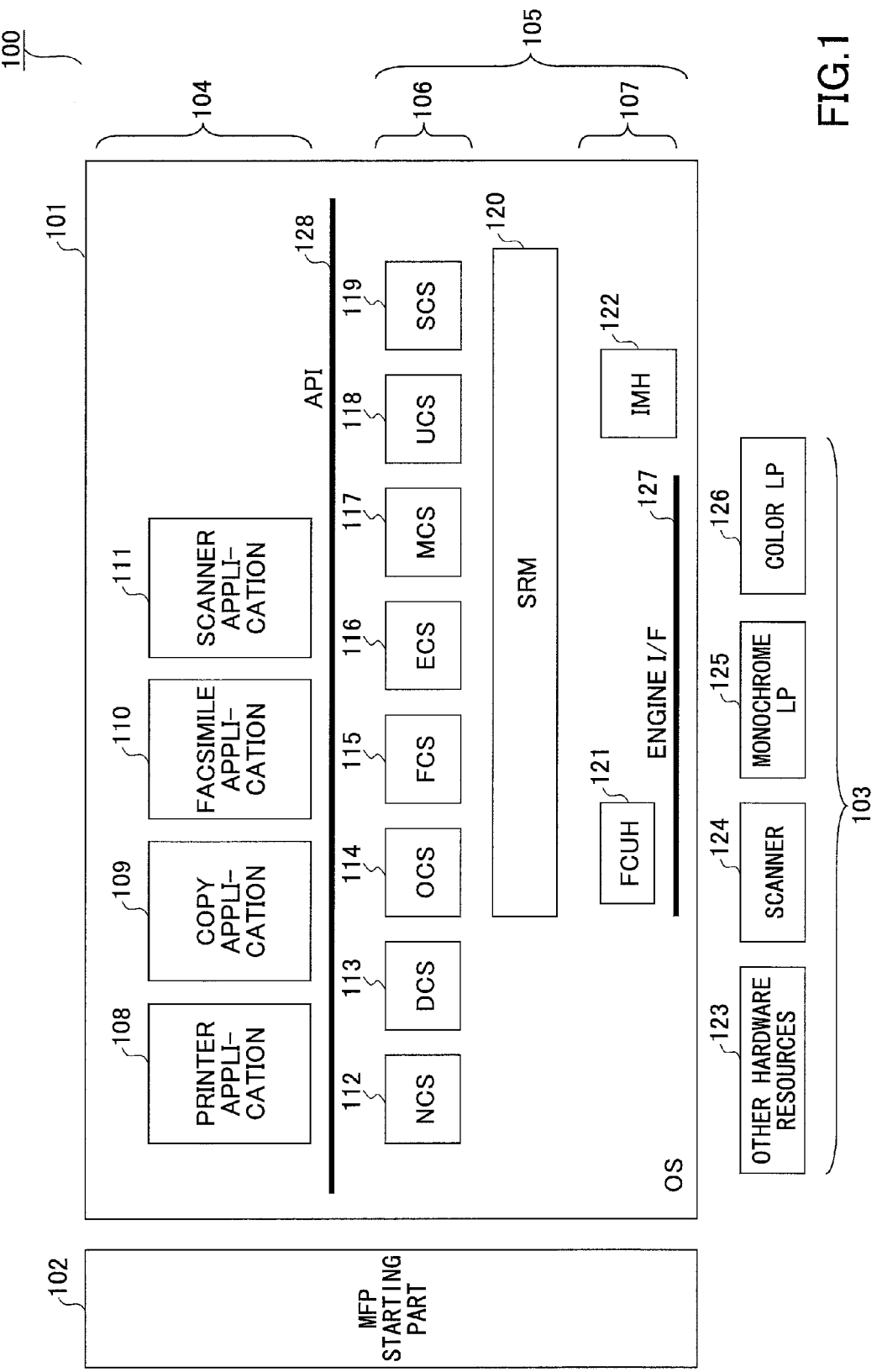
FIG. 1 shows a configuration diagram of a MFP common to a first embodiment, a second embodiment, a third embodiment and a fourth embodiment of the present invention.

FIG. 1 shows a configuration diagram of an MFP 100 common to the embodiments of the present invention. The MFP 100 includes a software group 101, a MFP starting part 102 and hardware resources 103. The hardware resources 103 include a scanner 124, a monochrome Laser Printer (LP) 125, a color LP 126, and other hardware resources 123.

The MFP starting part 102 is first started up when the power is supplied in the MFP 100, and starts up an application layer 104 and a platform layer 105 in the software group 101. For example, the MFP starting part 102 reads out, from a hard disk drive (described later) or the like, programs included in the application layer 104 and the platform layer 105, transfers the thus read out programs to a memory area, and thus, starts up the programs.

The software group 101 includes the application layer 104 and the platform layer 105 started up on an Operating System (OS) such as UNIX (registered trademark). The application layer 104 includes programs for carrying out processes unique to user services concerning image formation such as a printer service, a copy service, a facsimile service and a scanner service.

The application layer 104 includes a printer application 108, a copy application 109, a facsimile application 110, a scanner application 111 and so forth. The printer application 108 is an application for a printer. The copy application 109 is an application for copying. The facsimile application 110 is an application for facsimile. The scanner application 111 is an application for a scanner.

The platform layer 105 includes a control service layer 106, a System Resource Manager (SRM) 120, and a handler layer 107. The control service layer 106 interprets process requests sent from the application layer 104 and generates acquisition requests for obtaining the hardware resources 103. The SRM 120 manages the one or more hardware resources 103 and carries out arbitration of the acquisition requests sent from the control service layer 106. The handler layer 107 manages the hardware resources 103 in response to the acquisition requests sent from the SRM 120.

The control service layer 106 includes one or more service modules such as a Network Control Service (NCS) 112, a Delivery Control Service (DCS) 113, an Operation Control Service (OCS) 114, a Facsimile Control Service (FCS) 115, an Engine Control Service (ECS) 116, a Memory Control Service (MCS) 117, a User information Control Service (UCS) 118, a System Control Service (SCS) 119, and so forth.

Note that the platform layer 105 has an Application Programming Interface (API) 128 for making it possible to receive the process requests from the application layer 104 through a previously defined function(s). The OS executes, as processes, respective units of software in the application layer 104 and the platform layer 105, in parallel.

A process of the NCS 112 provides a service that can be used, in common, by applications that require inputting to and outputting from a network. The NCS 112 carries out intermediate transmission of data such as distribution of data obtained through each protocol from a network to applications and transmission of data from applications to a network. For example, the NCS 112 controls data communication with a network device connected via a network using Hyper Text Transfer Protocol Daemon (httpd) in Hyper Text Transfer Protocol (HTTP).

A process of the DCS 113 carries out control of delivery of a stored document and so forth. A process of the OCS 114 carries out control of an operation panel that is used as an information transmission device between a human operator and main control. A process of the FCS 115 provides an API for carrying out facsimile transmission and reception using PSTN or the like requested by the application layer, registration and/or citation of various sorts of facsimile data managed in a memory prepared for backup, reading data for facsimile transmission, receiving and printing facsimile data, and so forth.

A process of the ECS 116 controls engine parts such as the scanner 124, the monochrome LP 125, the color LP 126, and the other resources 123. A process of the MCS 117 carries out memory control for obtaining and releasing a memory, and using the hard disk drive. A process of the UCS 118 manages user information.

A process of the SCS 119 carries out processes of managing the applications, controlling an operation part, displaying a system screen page, displaying information using a LED, managing the hardware resources, carrying out interrupt control for an application, and so forth.

A process of the SRM 120 carries out arbitration in response to an acquisition request sent from a host layer that uses resources including the hardware resources 103 such as the scanner 124, the monochrome LP 125, the color LP 126, and controls execution thereof. Specifically, a process of the SRM 120 determines whether a resource is available (whether the resource is used by another acquisition request), and notifies the host layer that the resource concerning the acquisition request is available if it is available. A process of the SRM 120 carries out scheduling for using a resource(s) in response to an acquisition request from the host layer, and directly executes the required contents (for example, conveying paper and forming an image in the printer engine, securing a memory, generating a file, and so forth).

The handler layer 107 includes a FaCsimile Unit Handler (FCUH) 121 that manages a Facsimile Control Unit (FCU) 210 described later, and an Image Memory Handler (IMH) 122 that allocates a memory to a process and manages the allocated memory. The SRM 120 and the FCUH 121 send process requests to the hardware resources 103 using an Engine Interface (engine I/F) 127 by which it is possible to send the process requests to the hardware resources using a previously defined function(s).

Further, the IMH 122 manages, as resources, the hardware resources, and image data or a storage area that stores image data. Further, the IMH 122 carries out exclusive control of these resources using a mechanism of exclusive control provided by the OS, and thus, prevents collision of information and/or hardware.

The MFP 100 can execute, in an integrated manner, processes necessary for respective applications in common, in the platform layer 105.

In the above-described configuration, in a case of reading an image, a request occurs from the copy application 109, the facsimile application 110, the scanner application 111 or the like. In response to the request, data of the image read by the scanner 124 is written into a storage area in a memory or the like via the platform layer 105. The image data written into the storage area can be, for example, printed using the monochrome LP 125, the color LP 126 or the like via the engine I/F 128.

<Hardware Configuration>

Figure 2:
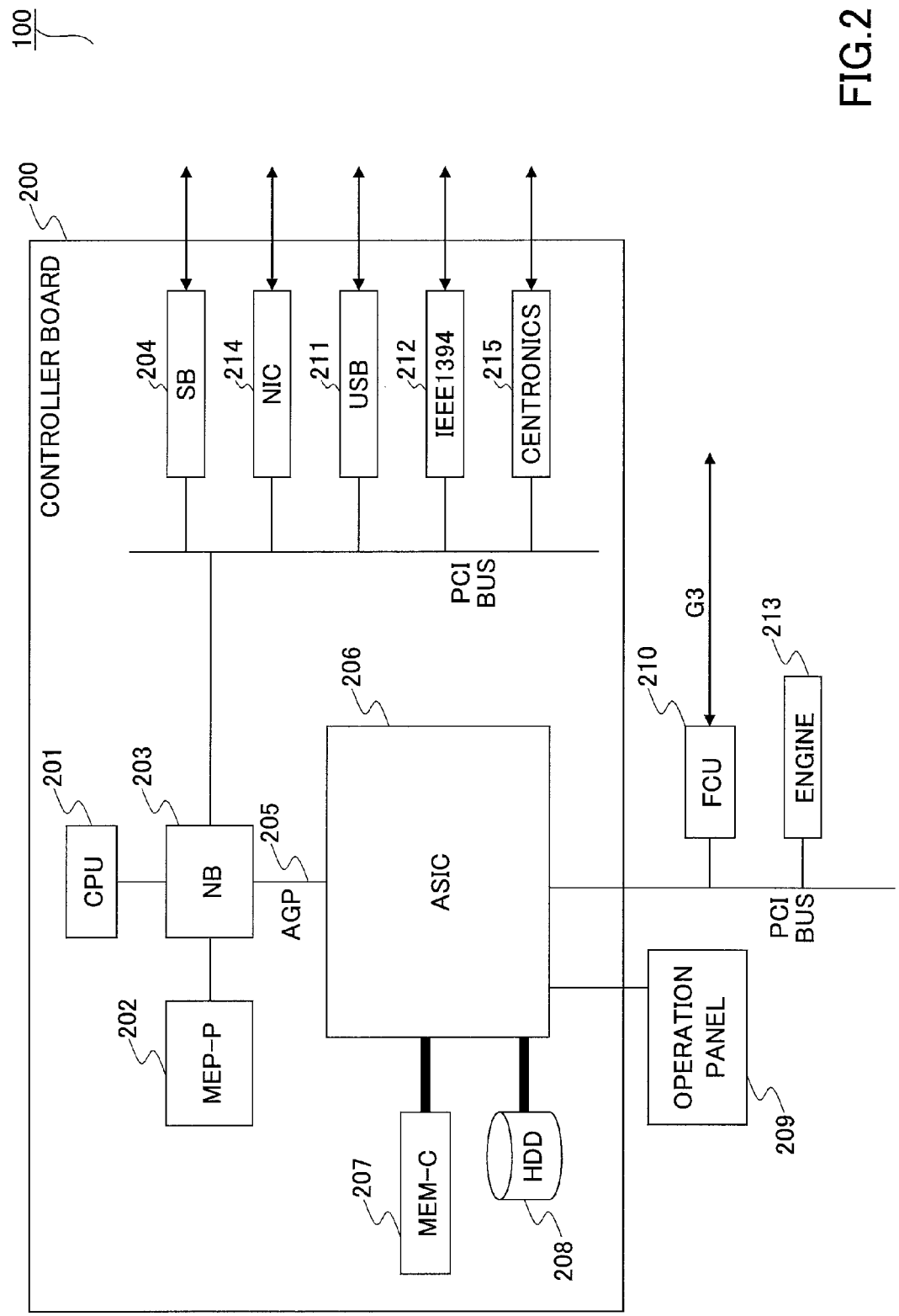
FIG. 2 shows a hardware configuration diagram of the MFP shown in FIG. 1.

FIG. 2 shows a hardware configuration of the MFP 100 common to the embodiments. The MFP 100 includes a controller board 200, the operation panel 209, the FCU 210 and the engine part 213. The engine part 213 includes, for example, the scanner 124, the monochrome LP 125 and the color LP 126, for example, shown in FIG. 1. Further, the controller board 200 includes a CPU 201, an ASIC 206, the Hard Disk Drive (HDD) 208, a system memory (MEM-P) 202, a local memory (MEM-C) 207, a North Bridge (NB) 203, a South Bridge (SB) 204, a Network Interface Card (NIC) 214, a USB device 211, an IEEE 1394 device 212 and a centronics device 215.

The operation panel 209 is connected with the ASIC 206 in the controller board 200. Further, the SB 204, the NIC 214, the USB device 211, the IEEE 1394 device 212 and the centronics device 215 are connected with the NB 203 via a PCI bus. Further, the FCU 210 and the engine part 213 are connected with the ASIC 206 on the controller board 200 via a PCI bus.

Note that, in the controller board 200, the local memory 207, the HDD 208 and so forth are connected with the ASIC 206, and also, the CPU 201 and the ASIC 206 are connected together via the NB 203 in a CPU chip set. As a result of the CPU 201 and the ASIC 206 being connected together via the NB 203, proper operations can be carried out even in a case where an interface of the CPU 201 is not open.

Further, the ASIC 206 and the NB 203 are connected not via a PCI bus but via an Accelerated Graphic Port (AGP) 205. By thus connecting the ASIC 206 and the NB 203 not via a low-speed PCI bus but via the AGC 205 for the purpose of controlling execution of one or more processes included in the application layer 104 or the platform 105, degradation in performance is avoided.

The CPU 201 controls the entirety of the MFP 100. The CPU 201 starts up the NCS 112, the DCS 113, the OCS 114, the FCS 115, the ECS 116, the MCS 117, the UCS 118, the SCS 119, the SRM 120, the FCUH 121 and the IMH 122 on the OS to cause them to function as respective processes, and implements them, respectively. Further, the CPU 201 also starts up and implements the printer application 108, the copy application 109, the facsimile application 110 and the scanner application 111 included in the application layer 104 in the same way.

The NB 203 is a bridge for connecting the system memory 202, the SB 204 and the ASIC 206. The system memory 202 is a memory for drawing an image prepared for the MFP 100, or the like. The SB 204 is a bridge for connecting the NB 203, the PCI bus and peripheral devices. The local memory 207 is a memory to be used as a buffer for an image to be copied and a buffer for storing code. The system memory 202 or the local memory 207 may be simply referred to as a "memory" or a "storage area", hereinafter.

The ASIC 206 is an IC for the purpose of image processing and has hardware elements prepared for image processing. The HDD 208 is a storage to be used for storing images, programs, font data, forms and so forth. The operation panel 209 is an operation part that receives a user's input and also carries out displaying information for a user.

<Functional Configuration>

Figure 3:
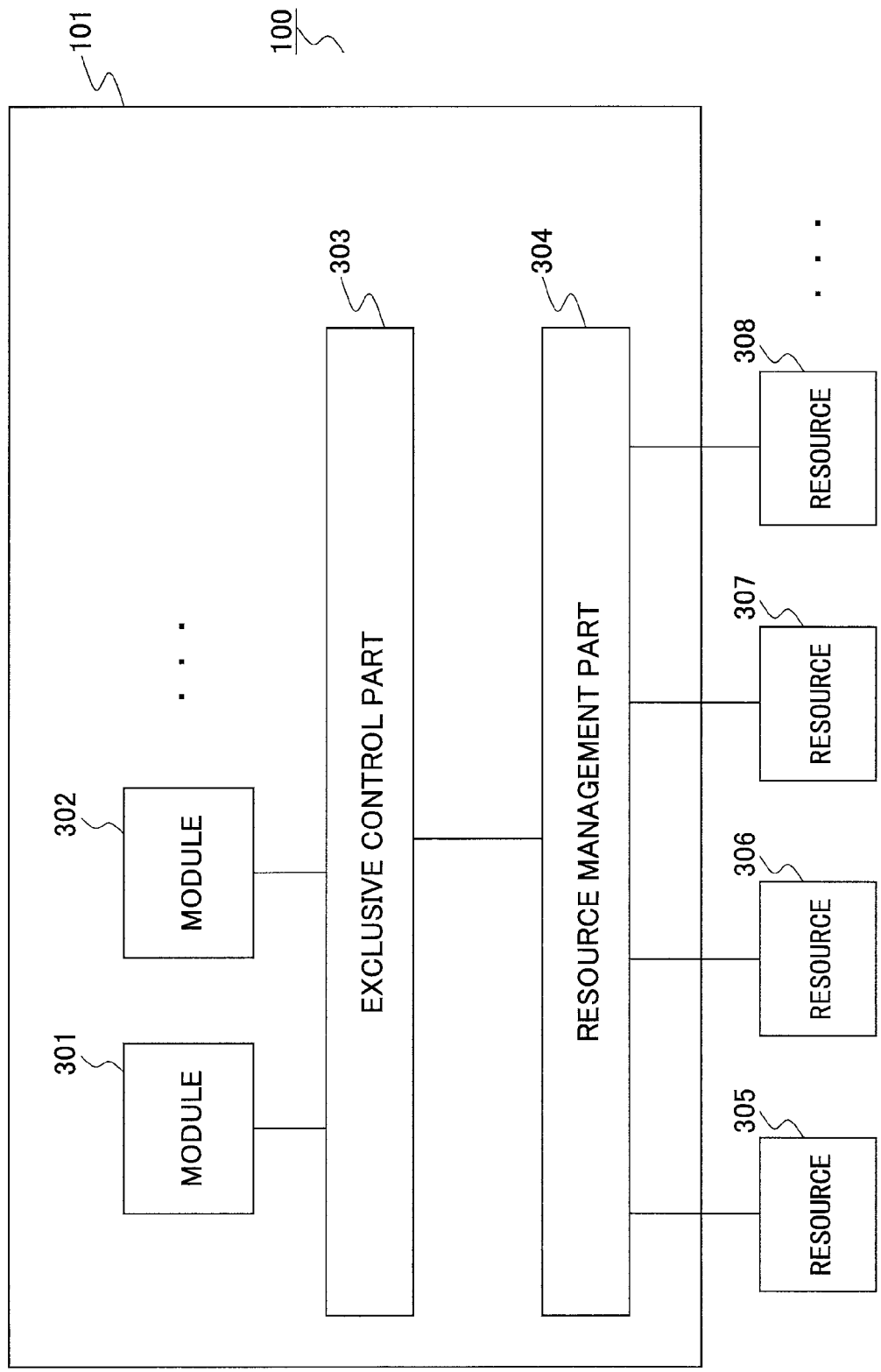
FIG. 3 shows a functional configuration diagram of the MFP shown in FIG. 1.

FIG. 3 shows one example of a functional configuration of the MFP 100. The MFP 100 includes one or more modules 301 and 302, an exclusive control part 303, a resource management part 304, and a plurality of resources 305, 306, 307 and 308. Note that the specific number of the modules 301 and 302 and the specific number of the resources 305-308 are merely one example, and may be other numbers, respectively.

The modules 301 and 302 are actually a program(s) for causing the CPU 201 or the like to implement predetermined functions, and, for example, are an application(s) included in the application layer 104 and/or a service(s) included in the control service layer 106. The resource management part 304 manages, as the resources 305-308, the hardware resource 103, image data, storage areas that store image data, and so forth. The exclusive control part 303 carries out exclusive control of the resources 305-308 and the modules 301 and 302, and so forth. Note that the resource management part 304 and the exclusive control part 303 are implemented by, for example, a program(s) executed by the CPU 201. The program(s) can be stored in, for example, the storage device such as the HDD 208 and/or the recording medium such as a USB memory or the like connected with the USB device 211 or the like.

Figure 4:
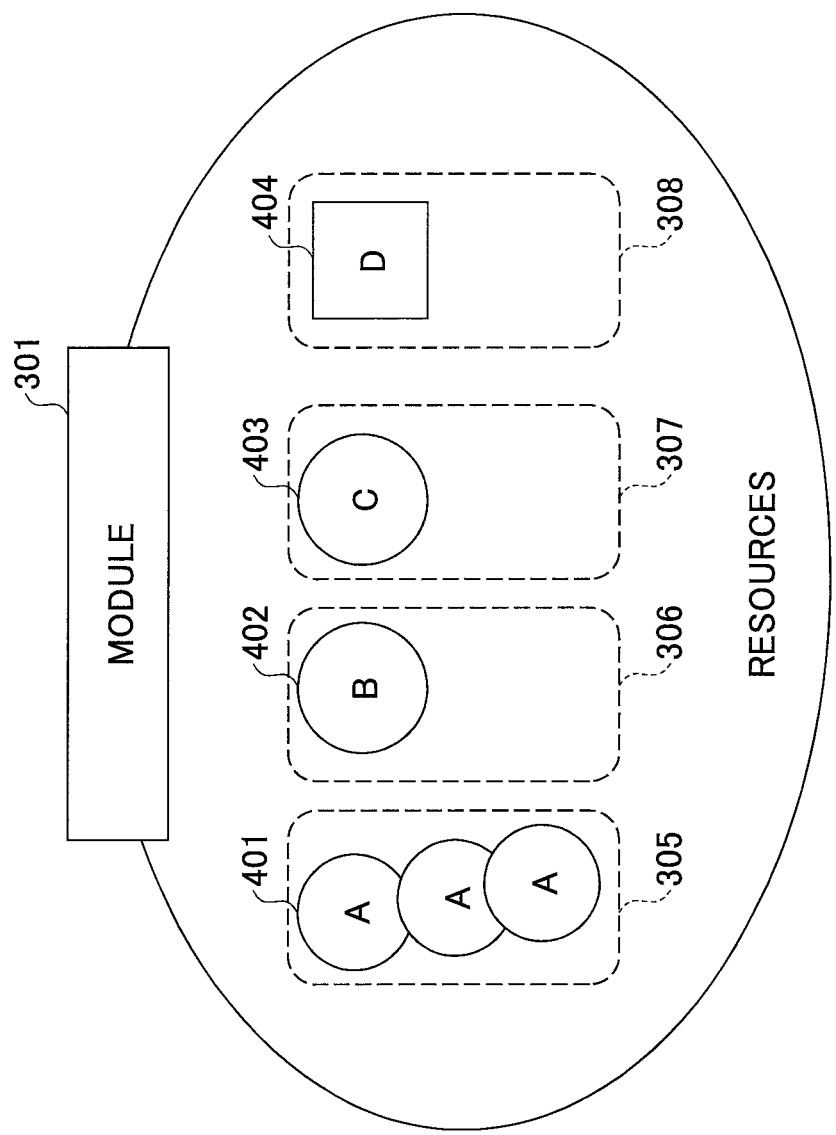
FIG. 4 shows a relationship between a module and resources in the MFP shown in FIG. 1.

Next, relationships between the modules and the resources will be described. FIG. 4 shows relationships between the modules and the resources in one example according to any one of the embodiments. The module 301 uses, in its process, the hardware resources 401, 402 and 403, and image data 404. The resource management part 304 manages, as the resources 305-305, these hardware resources 401-403, image data 404, and so forth. Note that in a case where a plurality of the identical hardware units are installed as in the hardware resource 401, the plurality of hardware units can be managed as a single resource.

Depending on a process that the module 301 executes, necessary resources are predetermined, and unnecessary resources are not accessed. Therefore, the exclusive control part 303 carries out exclusive control depending on the resources necessary for a process.

The exclusive control part 303 carries out exclusive control of the resource 305, for example, in a case where the resource 305 is used by a process of the module 301, and stops or finishes the exclusive control of the resource 305 when the use of the resource 305 has been finished. However, a deadlock may occur when the rights for the respective resources are obtained at random. Therefore, exclusive control of the module 301 is carried out before each resource is used, and a process of the module 301 obtains the right for each resource via the module 301.

Figure 5:
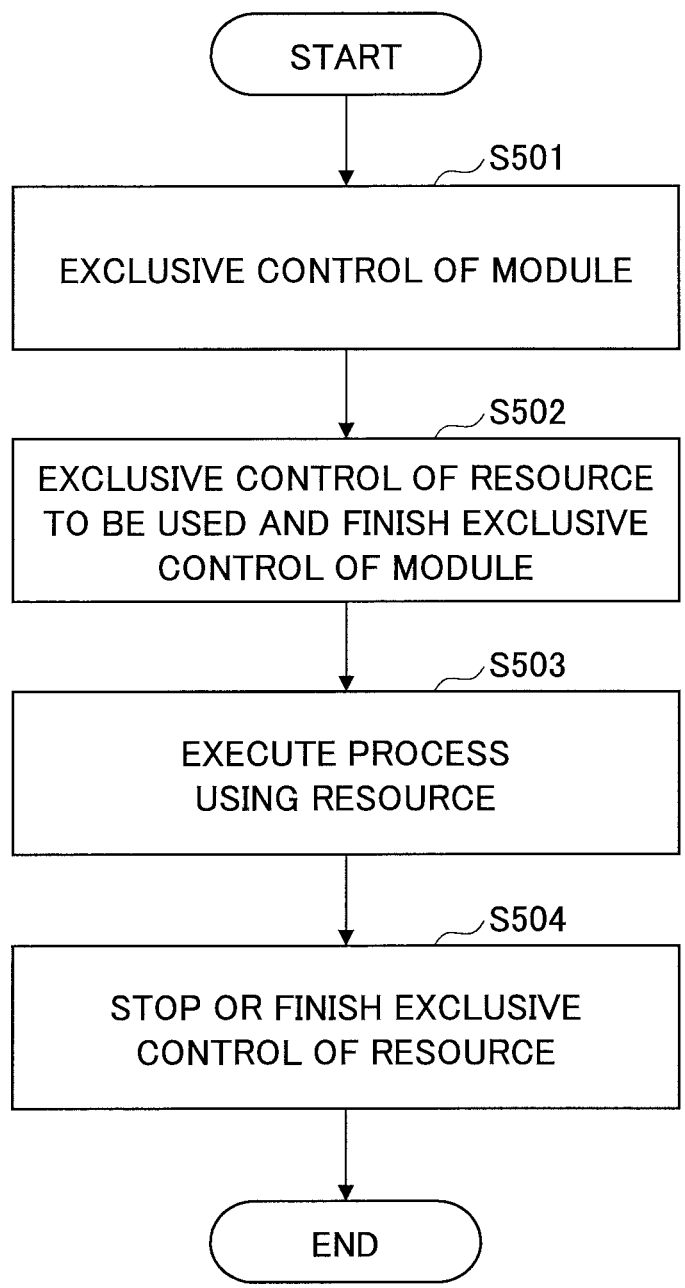
FIG. 5 is a flowchart showing a procedure of obtaining resources in the MFP shown in FIG. 1.

FIG. 5 is a flowchart showing a procedure of obtaining a resource in one example according to any one of the embodiments. For example, in a case where a process of the module 301 uses the resource 305, the exclusive control part 303 carries out exclusive control of the module 301 (step S501). Next, the exclusive control part 303 starts exclusive control of the resource 305, and stops or finishes the exclusive control of the module 301 (step S502). Next, in step S503, when the process using the resource 305 has been finished, the exclusive control part 303 stops or finishes the exclusive control of the resource 305 (step S504). The module 301 manages, in an integrated manner, the states of exclusive control carried out on each resource, and so forth. Thus, duplicate exclusive control carried out on each resource is prevented, and a deadlock is avoided.

<Explanation of Operations>

Next, operations in the MFP 100 will be described.

First Embodiment

Figure 6:
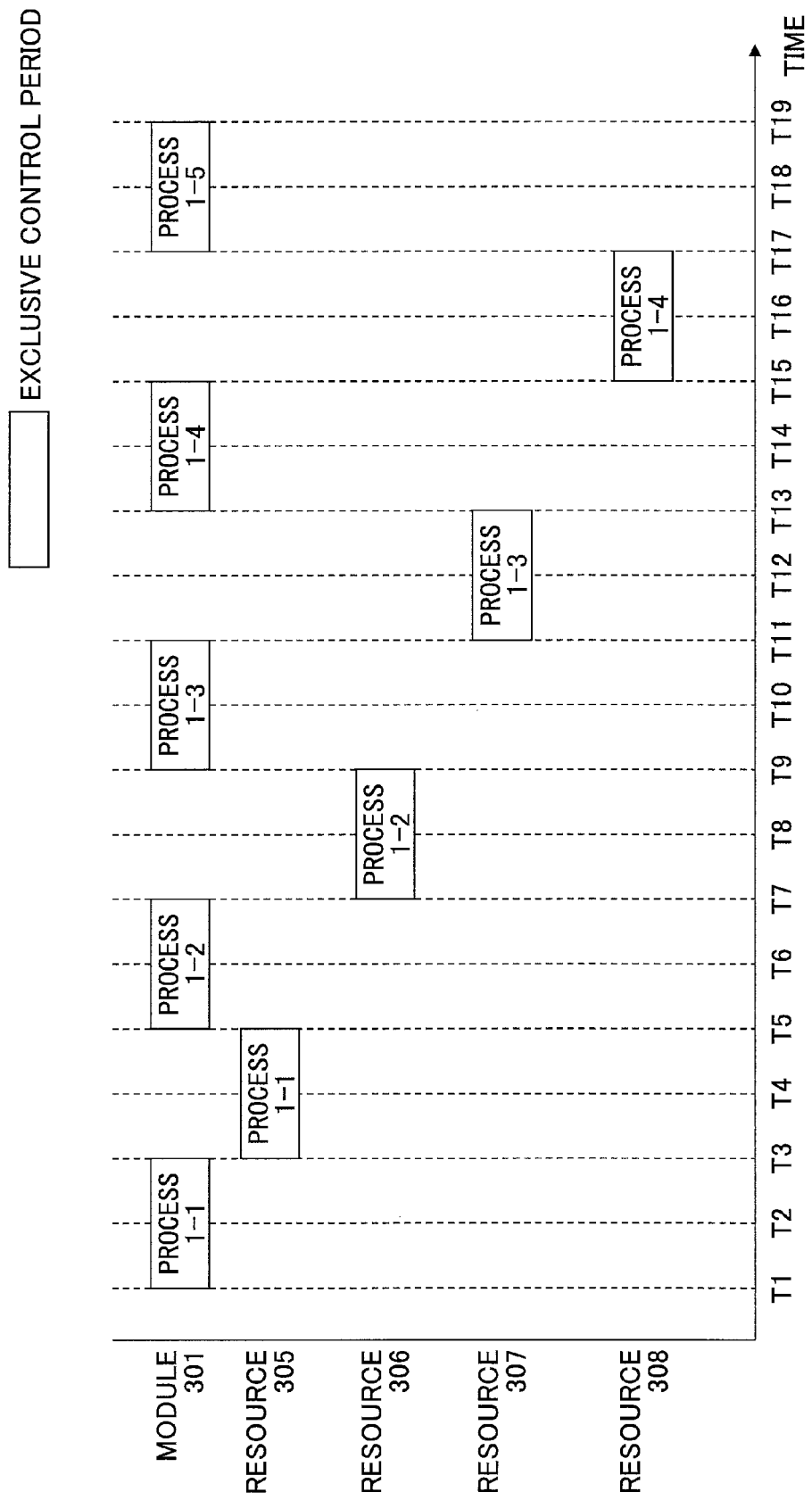
FIG. 6 shows a flow of exclusive control for a case where a single process is executed according to the first embodiment.

FIG. 6 shows a flow of exclusive control according to the first embodiment for a case of a single process. Here, it is assumed that a process 1 uses the resources 305, 306, 307 and 308 in sequence in the stated order.

In a case where a process 1-1 that is a process corresponding to the resource 305 in the process 1 uses the resource 305, the exclusive control part 303 carries out exclusive control of the module 301 at a time T1, and after that, the exclusive control part 303 starts exclusive control of the resource 305 at a time T3. Note that, according to the first embodiment, description is made assuming that, at the time T3 at which the exclusive control part 303 starts the exclusive control of the resource 305, or before that, the exclusive control part 303 stops or finishes the exclusive control of the module 301. However, such a manner does not limit the scope of the present invention. For example, it is also possible that, after the exclusive control part 303 starts the exclusive control of the resource 305, the exclusive control part 303 stops or finishes the exclusive control of the module 301. After the use of the resource 305 by the process 1-1 has been finished at a time T5, the resource management part 304 finishes the exclusive control of the resource 305.

When the process 1-1 has been finished at the time T5, a process 1-2 that is a process concerning the next resource 306 is started. The exclusive control part 303 carries out exclusive control of the module 301 at the time T5, and after that, starts exclusive control of the resource 306 at a time T7. Note that the exclusive control part 303 finishes the exclusive control of the module 301 at the time T7 of starting the exclusive control of the resource 306 or before that. Also as for a process 1-3 and a process 1-4, the processes are carried out in the same way in sequence. Finally, a process 1-5 is executed, and the process 1 is completed at a time T19. Thus, the exclusive control part 303 subdivides the exclusive control concerning the process 1 into the plurality of process units to correspond to the respective resources to be used. Further, the exclusive control part 303 stops or finishes the exclusive control of the module 301 during carrying out the process concerning each resource.

Figure 7:
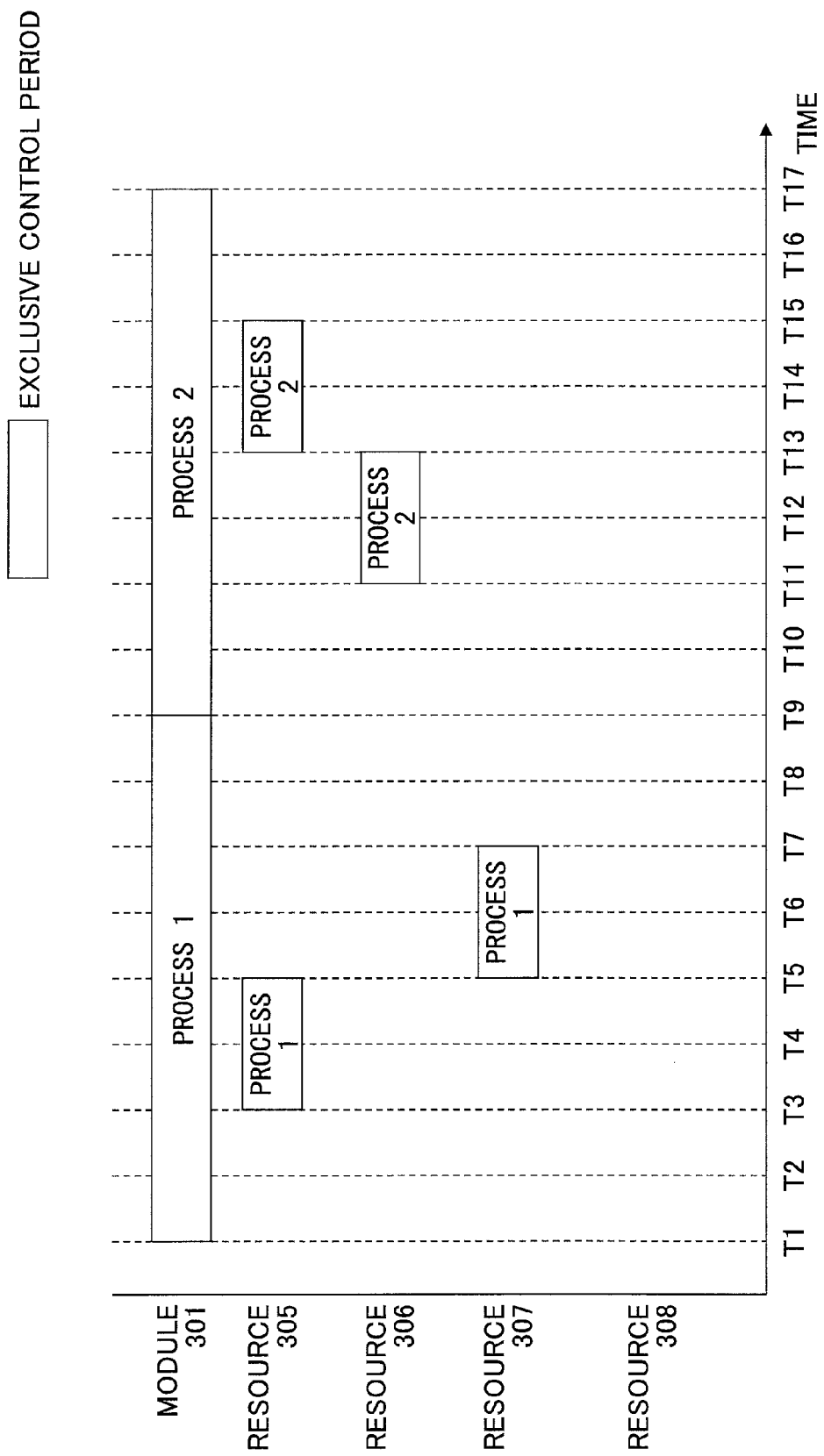
FIG. 7 shows one example of processing for a case where two processes are executed in the related art.

Next, operations for a case of two processes will be described. FIG. 7 shows a flow of a process in the related art in a case where the first embodiment is not applied. In FIG. 7, a process 1 is a process using the resources 305 and 307. Further, a process 2 is a process using the resources 306 and 305. In FIG. 7, exclusive control concerning the process 1 is not subdivided into a plurality of process units to correspond to the respective resources whereas the process is subdivided into the plurality of process units to correspond to the respective resources in the case of FIG. 6 described above. Therefore, exclusive control of the module 301 is continuously carried out on the module 301 from a time T1 of starting the process 1 until a time T9 of finishing the process 1. Therefore, the process 2 cannot be started until the time T9, and thus, a large delay may occur.

Figure 8:
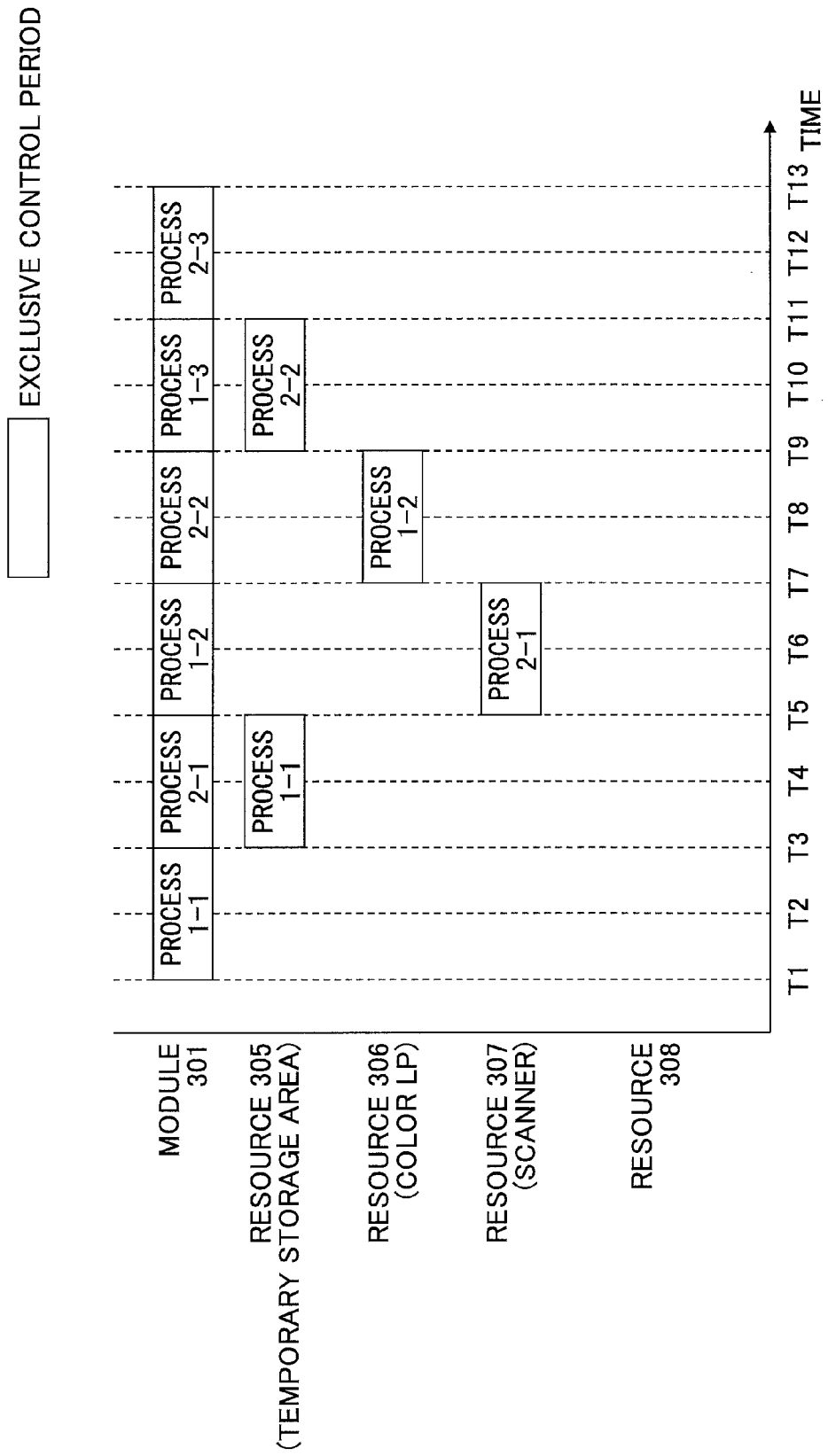
FIG. 8 shows a flow of exclusive control for a case where two processes are executed according to the first embodiment.

Next, FIG. 8 shows a flow of exclusive control according to the first embodiment for a case of two processes. In FIG. 8, at a time T1, a process 1-1 included in a process 1 concerning the resource 305 is started. In response, the exclusive control part 303 carries out exclusive control of the module 301. During a period of time of the exclusive control being carried out, the module 301 is not available to be used for any process other than the process 1-1. Next, the exclusive control part 303 finishes the exclusive control of the module 301 at a time T3, and carries out exclusive control of the resource 305. Thereby, the process 1-1 can use the resource 305. On the other hand, the resource 305 is not available to be used by any process other than the process 1-1.

When the exclusive control of the module 301 has been thus stopped or finished at the time T3, a process 2-1 in the process 2 concerning the resource 307 is started. In response to the start of the process 2-1, the exclusive control part 303 starts exclusive control of the module 301 at the time T3, and the module 301 is not available to be used for any process other than the process 2-1.

At a time T5, the exclusive control part 303 finishes the exclusive control of the module 301 concerning the process 2-1, and starts exclusive control of the resource 307. On the other hand, when the process concerning the resource 305 for the process 1-1 has been finished, the exclusive control part 303 finishes the exclusive control of the resource 305. At the time T5, the process 1-1 is finished, and thus, the module 301 is available. Therefore, a process 1-2 concerning the resource 307 that is a next resource in the process 1 is started. The exclusive control part 303 starts exclusive control of the module 301 in response to the start of the process 1-2.

At a time T7, the exclusive control part 303 finishes the exclusive control of the module 301 concerning the process 1-2, and starts exclusive control of the resource 306. On the other hand, when the process 2-1 has been finished at the time T7, the exclusive control part 303 finishes the exclusive control of the resource 307. Further, at the time T7, a process 2-2 concerning the resource 305 that is a next resource in the process 2 is started. In response to the start of the process 2-2, the exclusive control part 303 starts exclusive control of the module 301 at the time T7.

At a time T9, the exclusive control part 303 finishes the exclusive control of the module 301 concerning the process 2-2, and starts exclusive control of the resource 305. Further, in the process 1, at the time T9, the process 1-2 is finished and the process 1-3 is proceeded with. Next, in the process 2, at a time T11, the process 2-2 is finished and the process 2-3 is proceeded with.

Thus, the exclusive control concerning the respective processes is subdivided into a plurality of process units corresponding to the plurality of resources. Thereby, it is possible to carry out exclusive control of the minimum necessary resource(s) or module(s). Therefore, it is possible to reduce a delay caused by exclusive control in a case where a plurality of processes operate in parallel.

Explanation will be made using a specific example concerning correspondence between the resources 305, 306 and 307 and the respective hardware resources 103 in FIGS. 5 and 6. For example, in FIG. 8, it is assumed that the resource 305 is a temporary storage area for data, the resource 306 is the color LP 126, and the resource 307 is the scanner 124. Further, the process 1 is assumed to be a process of printing data in the temporary storage area using the color LP 126. The process 2 is assumed to be a process of storing data that is input through the scanner 124 in the temporary storage area.

In this case, in a manner of operations as that shown in FIG. 7, until a process of printing data in the temporary storage area using the color LP 126 is finished, a process of inputting data through the scanner 124 cannot be carried out. In contrast thereto, according to the first embodiment shown in FIG. 8, between a period of time (T3-T5) of reading data from the temporary storage area and a period of time (T7-T9) of printing the data using the color LP 126, it is possible to input data through the scanner 124.

Note that, in FIGS. 6, 7 and 8, for the purpose of simplifying explanation, the period of time of exclusive control for each process is assumed to be equal. However, the scope of the present invention is not limited in this manner. For example, at a time T5 in FIG. 8, the exclusive control of the module 301 for the process 2-1 is finished, and the exclusive control of the resource 307 is started. However, for example, if the process 2-1 executed by the module 301 has been completed at the time T4, the exclusive control of the module 301 can be finished and also the exclusive control of the resource 307 can be started at the time T4. The same manner of carrying out exclusive control of only a necessary module or resource only during a necessary period of time can also be applied to the periods of time of carrying out the exclusive control for the other processes.

Figure 9:
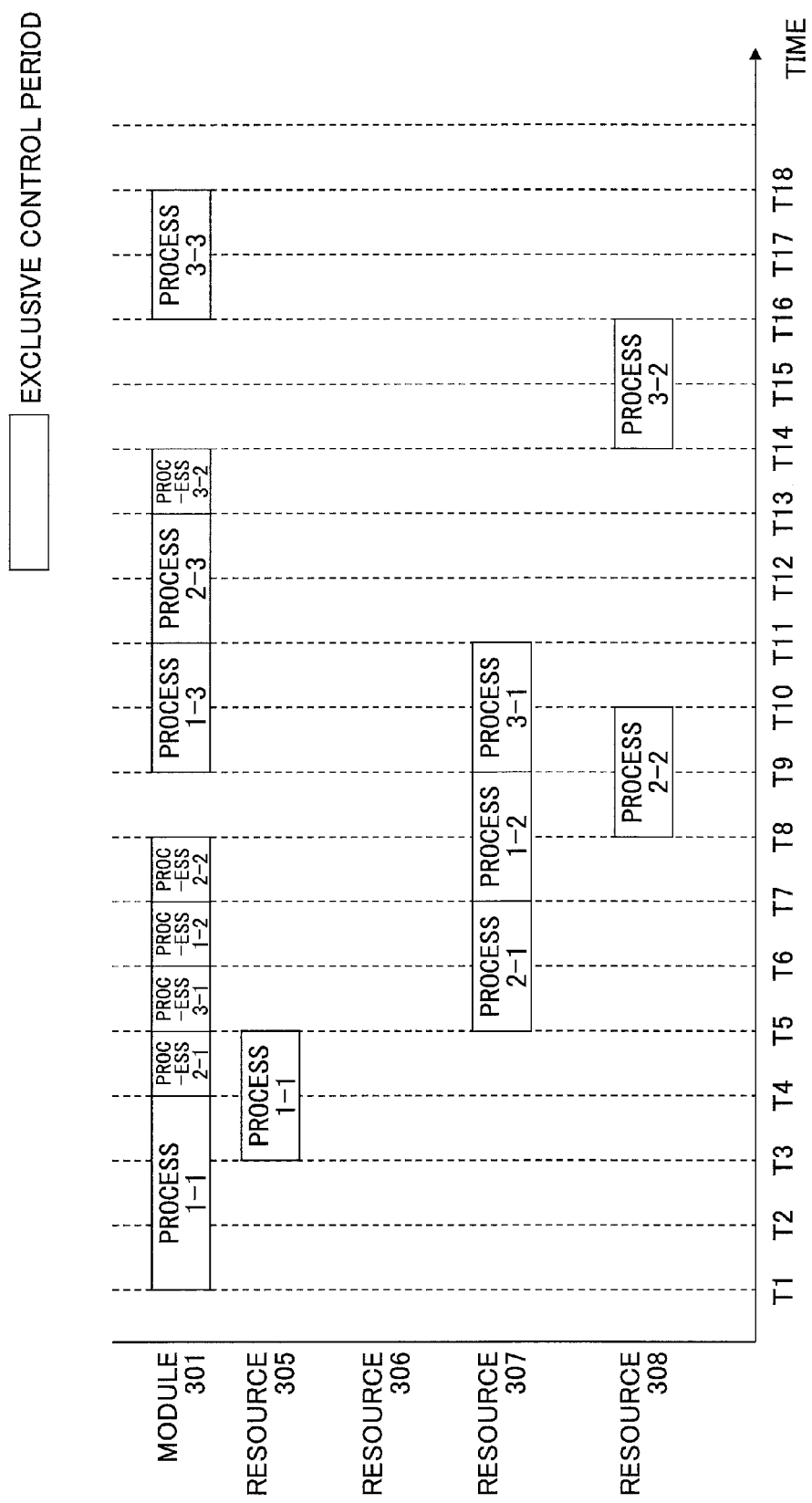
FIG. 9 shows a flow of exclusive control for a case where three processes are executed according to the first embodiment.

Next, operations in a case where a collision occurs among a plurality of processes for a resource will be described. FIG. 9 shows a flow of exclusive control in a case of three processes. Note that since a basic flow of exclusive control is the same as FIG. 8, description will be made in a manner of focusing at points different from FIG. 8.

Processes 1, 2 and 3 to be carried out by the module 301 use the resource 305 and the resource 307; the resource 307 and the resource 308; and the resource 307 and the resource 308, respectively. Therefore, every one of the processes 1, 2 and 3 uses the resource 307.

At a time T1 in FIG. 9, the exclusive control part 303 carries out exclusive control of the module 301 for the process 1-1. Next, at a time T4, the exclusive control of the module 301 for the process 1-1 is finished, and exclusive control of the resource 305 is started. When the module 301 is thus available at the time T4, the exclusive control part 303 carries out exclusive control of the module 301 for the process 2-1. Thereafter, at a time T5, the exclusive control of the module 301 for the process 2-1 is finished, and exclusive control of the resource 307 is started. Since the exclusive control of the module 301 for the process 2-1 is finished at the time T5, the module 301 is available to be used for another process. However, since the processes 1 and 2 are using the other resources, the module 301 cannot be used for any one of the processes 1 and 2. At this time, the module 301 is available to be used for a process 3 that is a new process.

At the time T5, the exclusive control part 303 carries out exclusive control of the module 301 for the process 3-1, and finishes the exclusive control of the module 301 at a time T6. However, at the time T6, the resource 307 that the process 3-1 is to use is already used by the process 2-1. Therefore, the process 3-1 cannot obtain the use right for the resource 307.

When the process 2-1 has been finished and the exclusive control of the resource 307 has been finished at a time T7, the resource 307 is available. However, at the time T7, the exclusive control of the module 301 for the process 1-2 is also finished. Therefore, at the time T7, use requests for the resource 307 occur from both the process 1-2 and the process 3-1. It is assumed that the exclusive control part 303 allocates the resource 307 preferentially to the process 1-2 concerning the process 1, the execution of which has been started prior to the execution of the process 3. In this case, the exclusive control part 303 starts exclusive control of the resource 307 for the process 3-1 at the time T9 at which the process 1-2 has been completed and the exclusive control of the resource 307 has been finished.

Similarly, at a time T11, collision of requests occurs between the process 2-3 and the process 3-2 for the module 301. In this case, the exclusive control part 303 allocates the resource 301 preferentially to the process 2-3 concerning the process 2, the execution of which has been started prior to the execution of the process 3.

Note that the above-mentioned operations are merely one example according to the first embodiment, and do not limit the scope of the present invention. For example, at the time T7 in FIG. 9, the process 1-2 concerning the process 1, the execution of which has been started earlier, is executed earlier than the process 3-1 to use the resource 307. However, depending on a request of the system or the like, it is also possible that the process 3-1, finished earlier concerning the module 301, is executed earlier to use the resource 307 than the process 1-2.

Thus, according to the first embodiment, it is possible to provide the image forming apparatus in which a delay occurring due to exclusive control is reduced.

Note that the first embodiment does not limit the scope of the present invention. The present invention can be used in various ways depending on a system, a user and/or the like. Below, several variations will be described as examples.

(First Variant)

Using FIG. 4, the description has been made that the resource management part 304 manages the hardware resources 401, 402, 403 and the image data 404 as the respective resources 305, 306, 306 and 308. However, instead of the image data 404, a temporary storage area storing the image data 404 can be managed as the resource 308. Further, as a more preferable example, as shown in FIG. 10, it is advantageous to manage image data in such a manner that a temporary storage area storing the image data is divided into a plurality of resources.

Figure 10:
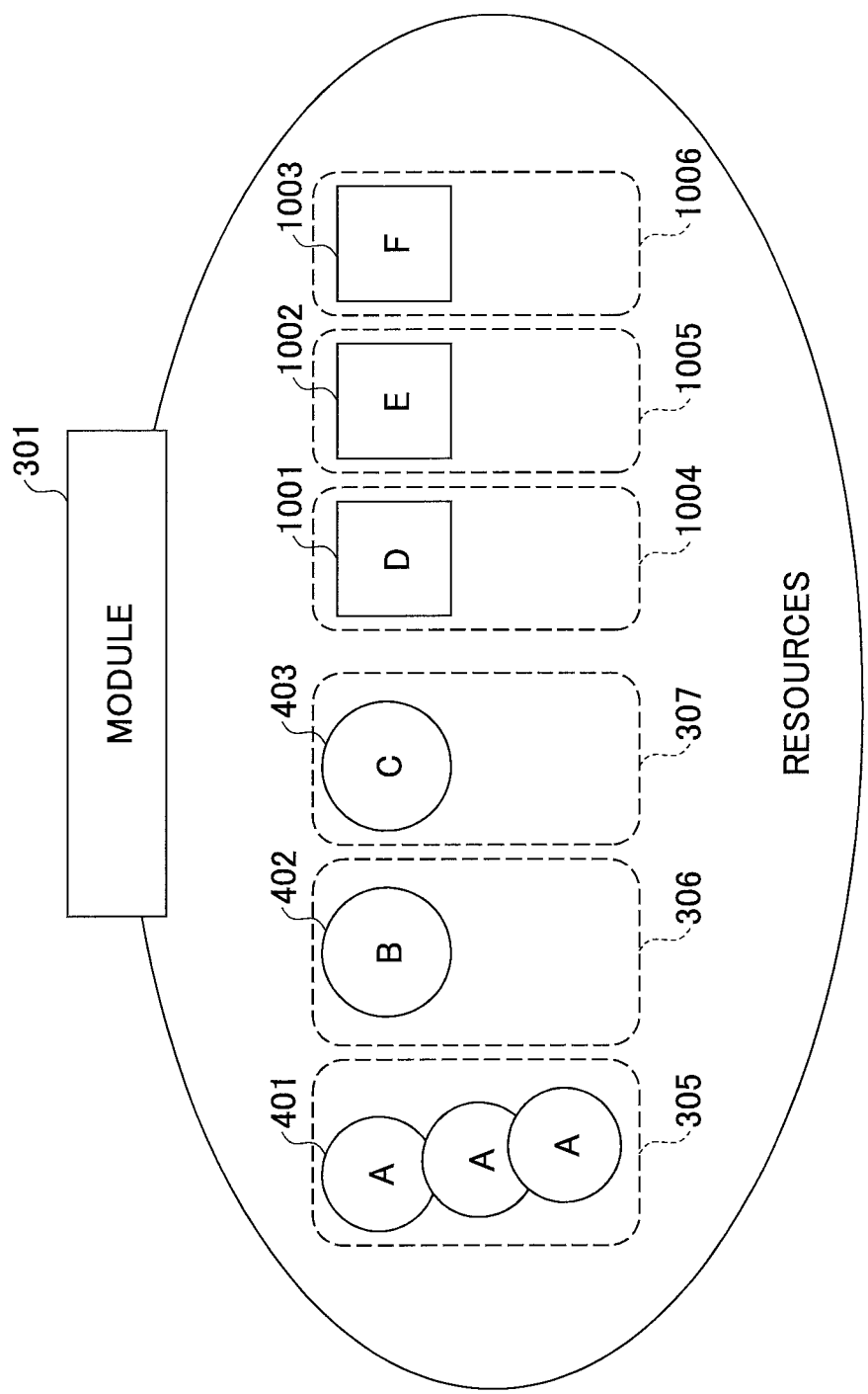
FIG. 10 shows a configuration example of resources according to a first variant of the first embodiment.

In FIG. 10, the resource management part 304 manages the hardware resources 401, 402, 403 and a plurality of temporary storage areas 1001, 1002, 1003 provided in a memory, as respective resources 305, 306, 307, 1004, 1005 and 1006.

In the above-mentioned configuration, even in a case where the temporary storage area 1001 has been used by a process 1, for example, another process can use the other storage area 1002 or 1003. Thus, it is possible to reduce a delay occurring due to exclusive control of the temporary storage area 1001.

(Second Variant)

Figure 11:
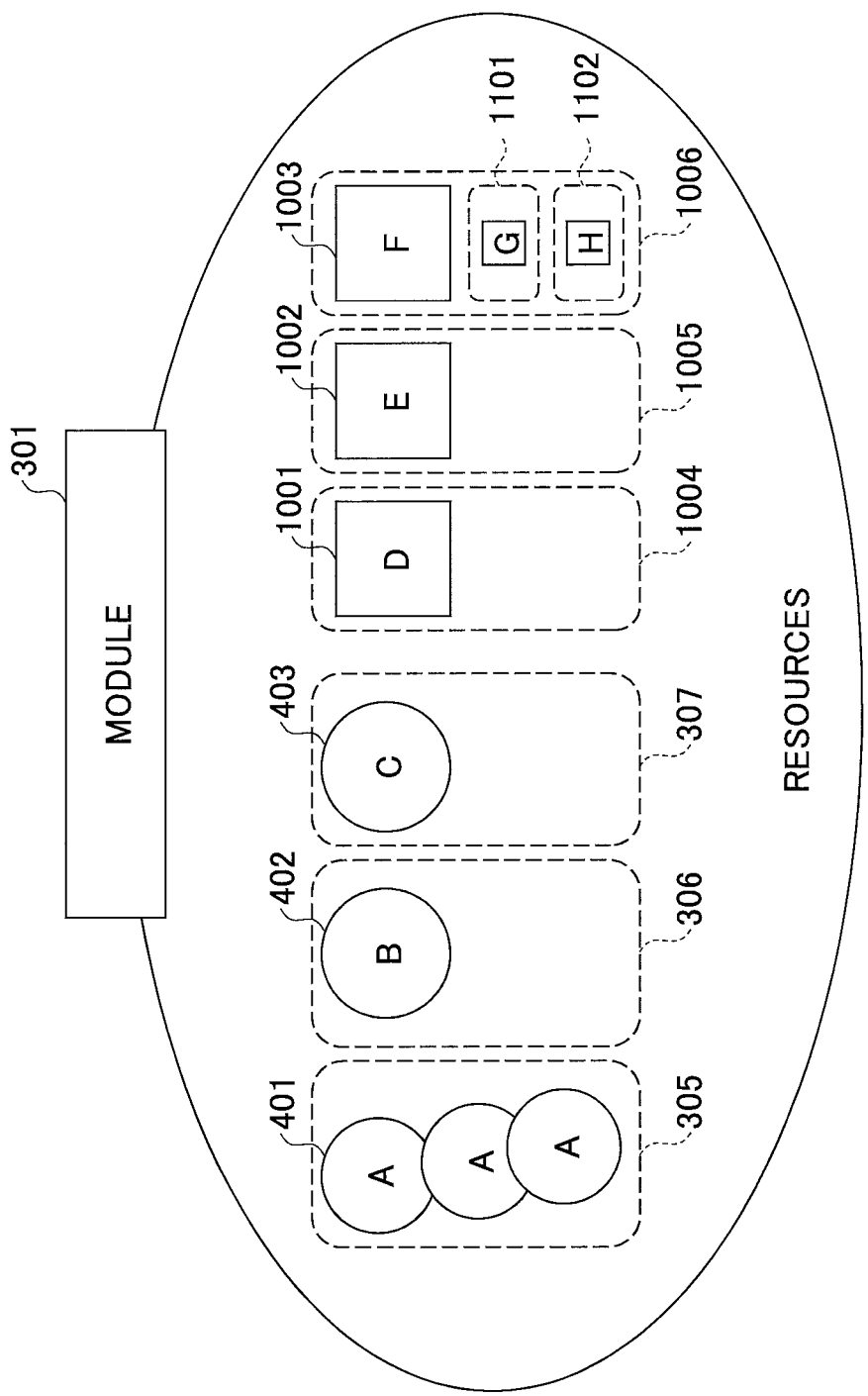
FIG. 11 shows a configuration example of resources according to a second variant of the first embodiment.
Figure 12:
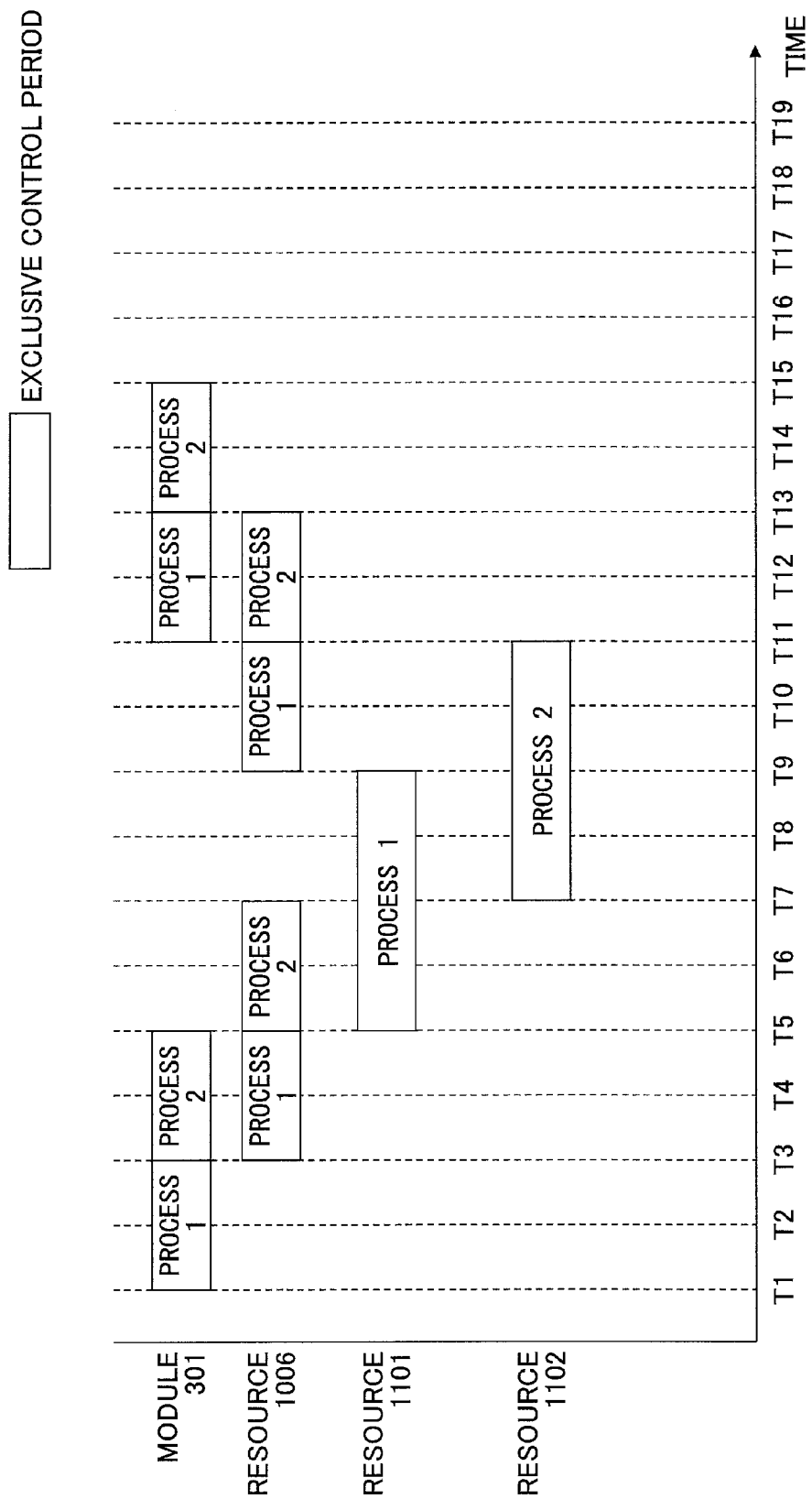
FIG. 12 shows a flow of exclusive control according to the second variant of the first embodiment.

FIG. 11 shows one example of a configuration of resources according to a second variant of the first embodiment. Each resource can further include sub-resources obtained from subdividing the resource. In the example of FIG. 11, a resource 1006 has sub-resources 1101 and 1102. FIG. 12 shows a flow of exclusive control in a case where the sub-resources 1101 and 1102 are used by processes 1 and 2.

Using FIG. 12, a flow of a process will be described. In this example, the process 1 uses the sub-resource 1101, and the process 2 uses the sub-resource 1102. At a time T1, the exclusive control part 303 carries out exclusive control of the module 301 for the process 1. At a time T3, the exclusive control part 303 stops or finishes the exclusive control of the module 301 for the process 1, and carries out exclusive control of the resource 1006 for the process 1. Further, at a time T5, the exclusive control part 303 stops or finishes the exclusive control of the resource 1006 for the process 1, and starts exclusive control of the sub-resource 1101 for the process 1. When the use of the sub-resource 1101 has been finish at a time T9 for the process 1, the exclusive control part 303 finishes the exclusive control of the sub-resource 1101 for the process 1, and carries out exclusive control of the resource 1006 for the process 1. Next, at a time T11, the exclusive control part 303 finishes the exclusive control of the resource 1006 for the process 1, and starts exclusive control of the module 301 for the process 1. Also the process 2 is executed in the same way.

In the above-mentioned operations, at the time T5 at which the exclusive control of the sub-resource 1101 is started for the process 1, the exclusive control of the resource 1006 is stopped or finished for the process 1. Therefore, the process 2 can use the sub-resource 1102 in parallel at the time T7.

In the above-mentioned configuration, it is possible to subdivide a resource into a plurality of sub-resources, and manage them. Further, it is possible to reduce a delay occurring due to exclusive control of a resource and a sub-resource.

(Third Variant)

Figure 13:
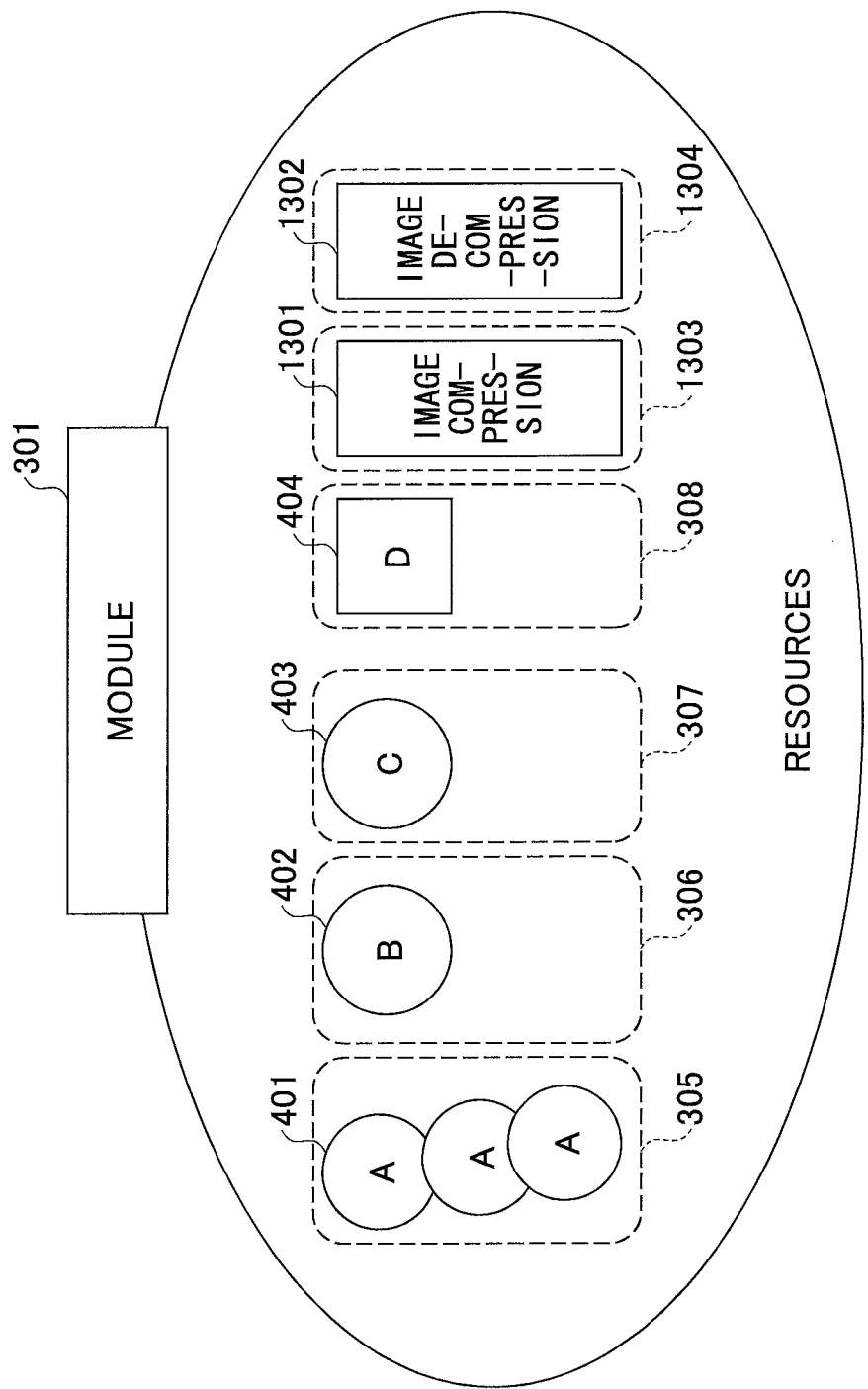
FIG. 13 shows a configuration example of resources according to a third variant of the first embodiment.

FIG. 13 shows an example of a configuration according to a third variant of the first embodiment. As resources managed by the resource management part 304, software resources such as libraries for carrying out compression and/or decompression can be managed in addition to hardware resources and image data or storage areas storing image data.

For example, the resource management part 304 manages an image compression library 301 and an image decompression library 302, shown in FIG. 13, as resources 1303 and 1304, respectively.

In the above-mentioned configuration, it is possible to reduce a delay due to exclusive control also when a process of the module 301 uses the image compression library 301 and the image decompression library 302.

(Fourth variant)

Figure 14:
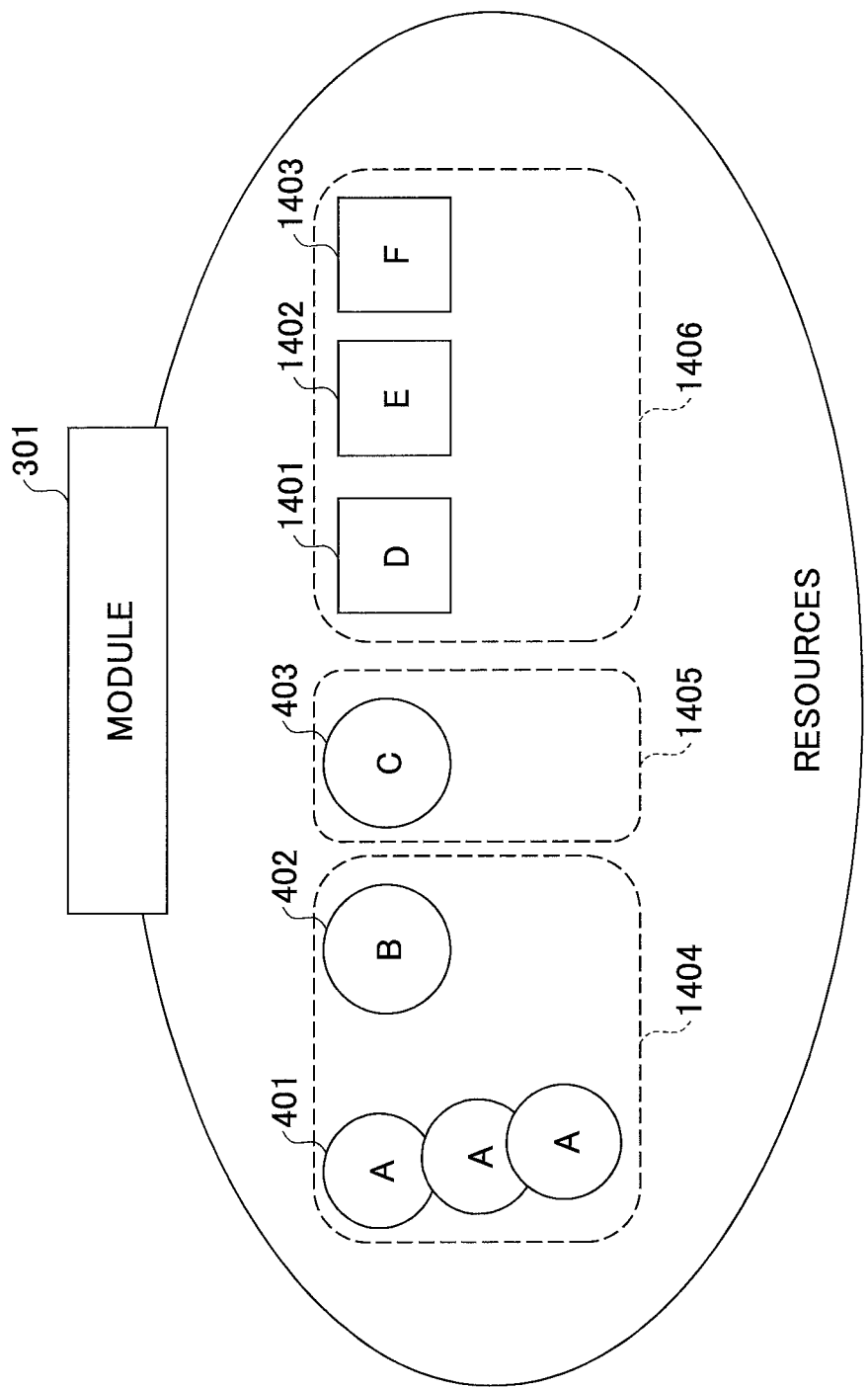
FIG. 14 shows a configuration example of resources according to a fourth variant of the first embodiment.

FIG. 14 shows an example of a configuration according to a fourth variant of the first embodiment. If necessary, the resource management part 304 can collect a plurality of hardware resources, image data or storage areas, and so forth, and manage them as a single resource. In the example of FIG. 14, hardware resources 401 and 402 are collected and are managed as a single resource 1404. Further, a plurality of sets of image data 1401, 1402 and 1403 are collected and are managed as a single resource 1406.

For example, in a case where it is required to carry out copying operations preferentially over other processes, it is possible to avoid a delay due to exclusive control, by collecting the scanner 124 and the monochrome LP 125 and managing them as a single resource.

Second Embodiment

In the first embodiment described above, the examples have been described for the cases of subdividing exclusive control concerning a plurality of processes of a module in the image forming apparatus 100 to correspond to resources. In the second embodiment, examples will be described for cases where exclusive control is subdivided into a plurality of process units based on processing speeds of a plurality of resources, as a preferable example of subdividing exclusive control concerning a plurality of processes of a module.

Figure 15:
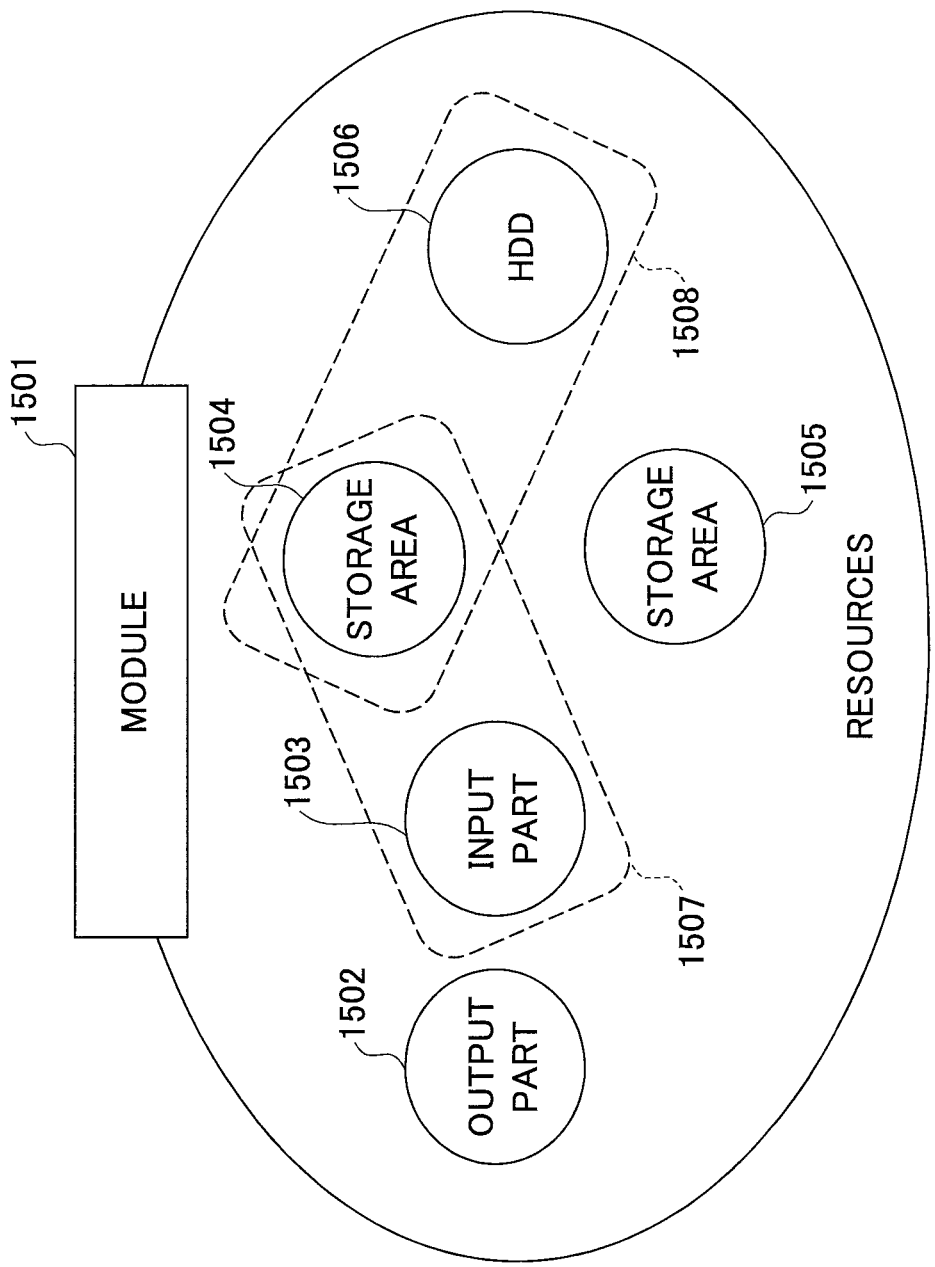
FIG. 15 shows process units concerning exclusive control for a process 1 according to the second embodiment.

FIG. 15 shows process units concerning exclusive control for a process 1 according to the second embodiment. In FIG. 15, a module 1501 includes a plurality of resources such as an output part 1502, an input part 1503, and a plurality of storage areas 1504 and 1505 and a HDD 1506 that store image data.

The output part 1502 is, for example, a printer engine such as the monochrome LP 125 or the color LP 126 shown in FIG. 1. The input part 1503 is, for example, an image input part such as the scanner 124 shown in FIG. 1. The plurality of storage areas 1504 and 1505 are, for example, storage areas provided in the system memory 202, the local memory 207 and/or the like, shown in FIG. 2. The HDD 1506 is, for example, a storage device such as the HDD 208 shown in FIG. 2.

The process 1 is, for example, an input process of storing image data read through the input part 1503 in the storage area 1504, and storing the image data once stored in the storage area 1504 then in the HDD 1506. Further, the process 1 uses the input part 1503, the storage area 1504 and the HDD 1506 that are a plurality of resources, and the processing speed of the storage area 1504 is sufficiently higher than the processing speeds of the input part 1503 and the HDD 1506, for example.

In such a case, it is preferable that exclusive control concerning the process 1 is not divided into three to correspond to these three resources but is divided into two, paying attention to a process concerning the input part 1503 and a process concerning the HDD 1506 that are the resources having relatively low processing speeds. For example, as shown in FIG. 15, the input part 1503 and the storage area 1504 are included in a process unit 1507, and the storage area 1504 and the HDD 1506 are included in a process unit 1508. Thereby, exclusive control can be prevented from being carried out on the two resources simultaneously that have the low processing speeds. Note that the processing speed of the storage area 1504 is sufficiently higher than the processing speeds of the input part 1503 and the HDD 1506, and therefore, the influence on the delay time is a little even when exclusive control is carried out on the storage area 1504 together with the input part 1503 or the HDD 1506.

Figure 16:
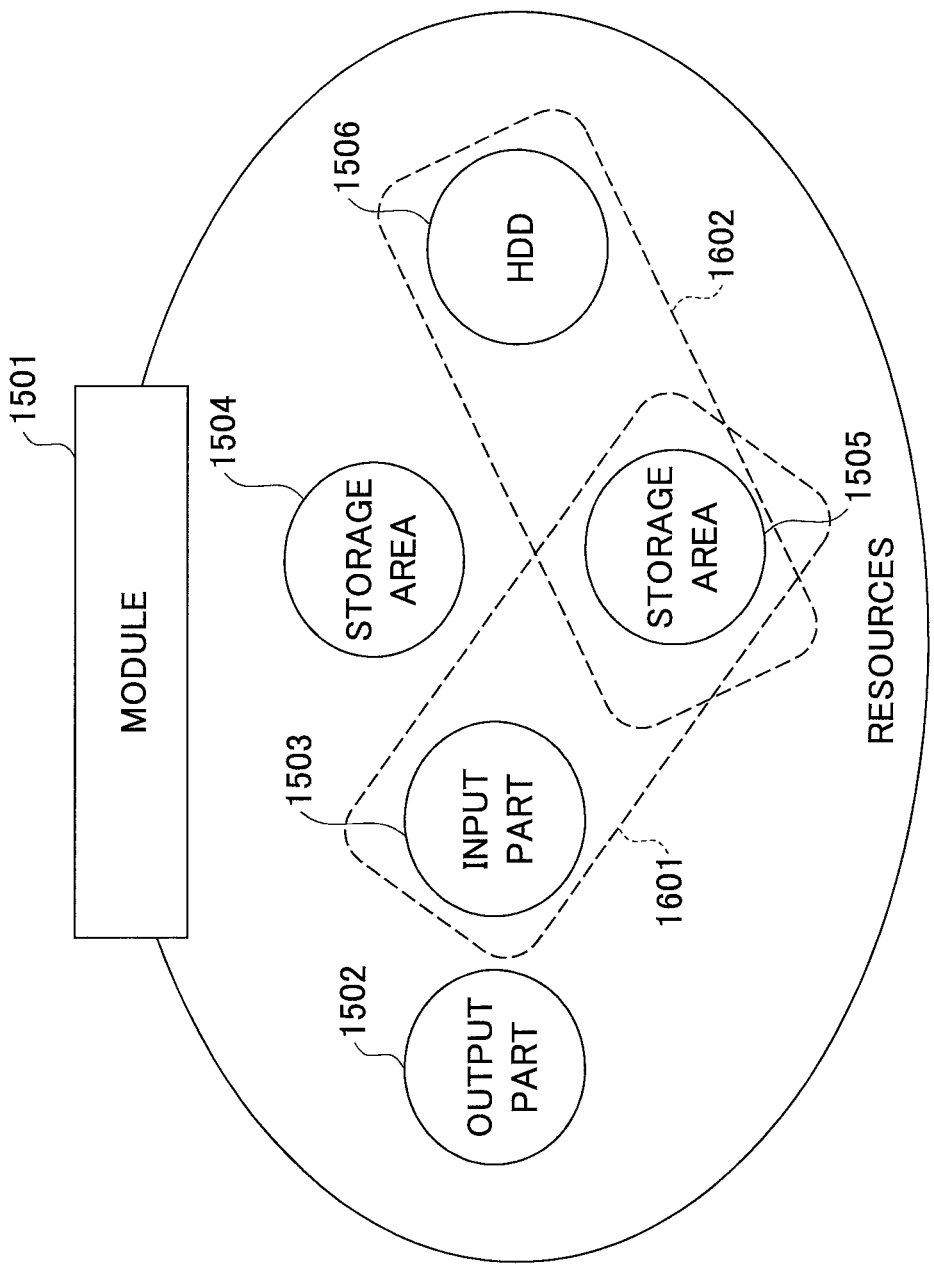
FIG. 16 shows process units concerning exclusive control for a process 2 according to the second embodiment.

FIG. 16 shows process units concerning exclusive control for a process 2 according to the second embodiment. The process 2 is an input process of storing image data read through the input part 1503 in the storage area 1505, and storing the image data first stored in the storage area 1505 then in the HDD 1506. According to the second embodiment, in the same manner as FIG. 15, exclusive control is divided into two process units, i.e., a process unit concerning the input part 1503 and a process unit concerning the HDD 1506 that are the resources having the relatively low processing speeds.

For example, as shown in FIG. 16, the input part 1503 and the storage area 1505 are included in the process unit 1601, and the storage area 1505 and the HDD 1506 are included in the process unit 1602. Thereby, exclusive control can be prevented from being carried out on the two resources simultaneously having the low processing speeds, the same as the process 1.

Note that, in FIGS. 15 and 16, description has been made for the case where the number of resources having the relatively low processing speeds is two. However, in a case where the number of resources having relatively low processing speeds is three or more, the resources can be advantageously divided for the number of process units corresponding to the number of the resources having relatively low processing speeds.

Further, it possible to determine whether each resource has a low processing speed by, for example, storing a table in which information concerning the respective processing speeds of a plurality of resources, for example, required processing times, flags indicating that processing speed is low or the like is recorded in the HDD 208 shown in FIG. 2.

<Flow of Processing>

Figure 17:
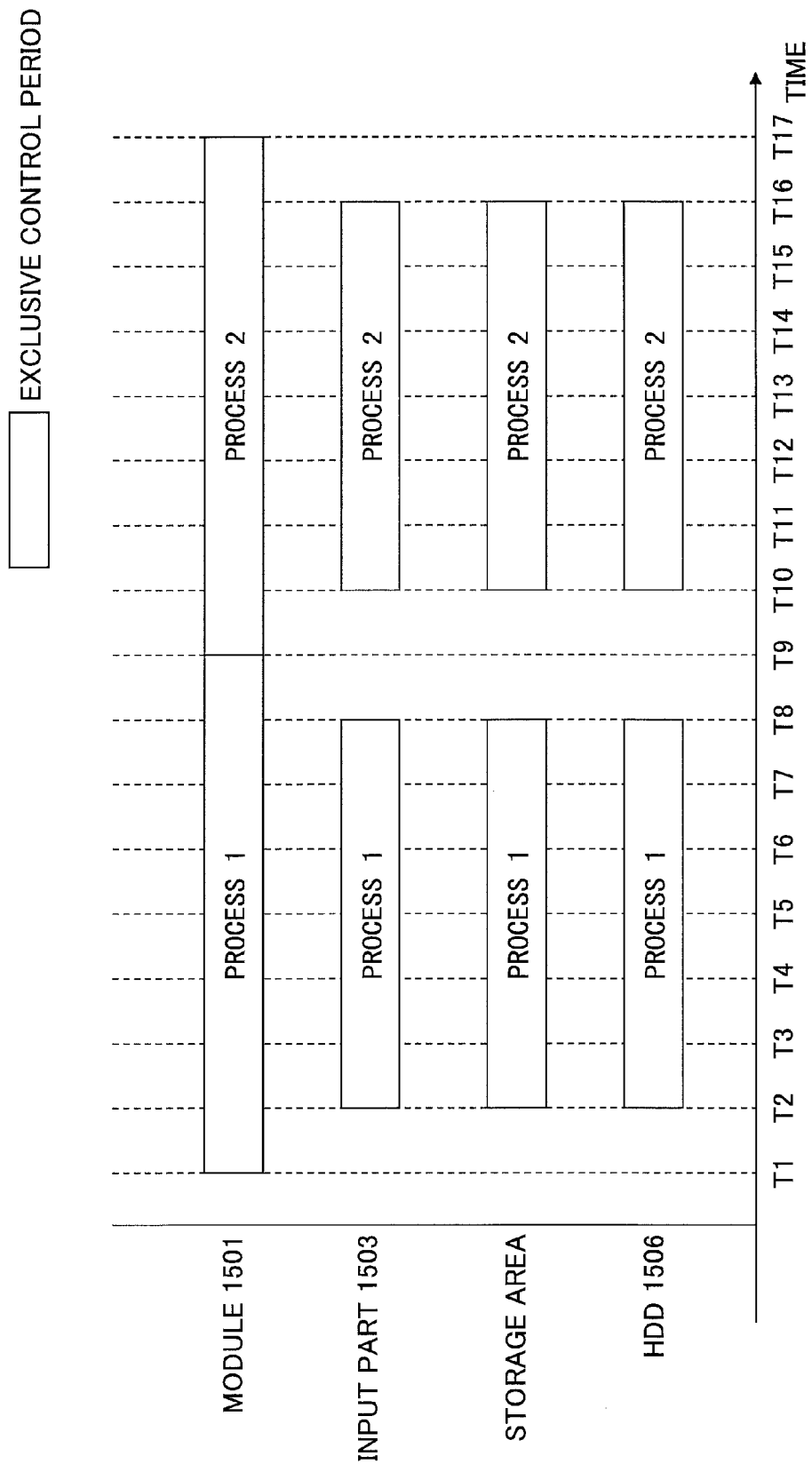
FIG. 17 shows one example of an input process in the related art.

FIG. 17 shows one example of an input process in the related art. In FIG. 17, when the process 1 has been started at a time T1, the exclusive control part 303 carries out exclusive control of the module 1501. At this time, a start process in the process 1 is executed that includes a process of obtaining access rights for resources to be used, and so forth, for example. Then, at a time T2, the exclusive control part 303 carries out exclusive control of the input part 1503, the storage area (for example, the storage area 1504) and the HDD 1506 for which the process 1 has obtained the access rights.

During a time T2-T8, a predetermined input process in the process 1 is executed using the input part 1503, the storage area and the HDD 1506. When the input process in the process 1 has been finished at a time T8, the exclusive control part 303 finishes the exclusive control of the input part 1503, the storage area and the HDD 1506. Then, an end process in the process 1 is executed including, for example, a process of releasing the access rights for the resources which have been already used, and so forth. At a time T9, the exclusive control part 303 finishes the exclusive control of the module 1501 concerning the process 1, and the process 1 is finished.

Since the exclusive control is carried out on the module 1501 during the period of time T1-T9, the module 1501 is not available to be used to start the process 2. Further, during the period of time T2-T8, the exclusive control is carried out on the input part 1503, the storage area and the HDD 1506. Therefore, these resources cannot be accessed not only by the process 2 but also another process or the like.

Further, when the exclusive control of the module 1501 concerning the process 1 has been finished at the time T9, execution of the process 2 is started. When the process 2 is executed at the time T9, the exclusive control part 303 carries out exclusive control of the module 1501. At this time, a start process in the process 2 is executed including a process of obtaining access rights for resources to be used, and so forth, for example. Then, at a time T10, the exclusive control part 303 carries out exclusive control of the input part 1503, the storage area (for example, the storage area 1504) and the HDD 1506 for which the process 2 has obtained the access rights.

During a time T10-T16, a predetermined input process in the process 2 is executed using the input part 1503, the storage area and the HDD 1506. When the input process in the process 2 has been finished at a time T16, the exclusive control part 303 finishes the exclusive control of the input part 1503, the storage area and the HDD 1506. Then, an end process in the process 2 is executed including, for example, a process of releasing the access rights for the resources which have been already used, and so forth. At a time T17, the exclusive control part 303 finishes the exclusive control of the module 1501 concerning the process 2, and the process 2 is finished.

Thus, in the exclusive control method according to the related art, the exclusive control is carried out on the input part 1503 and the HDD 1506 that have, for example, the relatively low processing speeds, and the module 1501, together. Therefore, the delay time due to the exclusive control may be longer.

However, in the related art, the processing time (transfer time) in the HDD 1506 is shorter than the processing time (input time) of the input part 1503. Therefore, the problem has not become apparent even in the exclusive control method of FIG. 17. However, recently, due to improvement in the processing speed of the input part 1503 and so forth, the processing time of the input part 1503 is reduced. Also, due to an increase in image quality, the transfer time of the HDD 1506 is increased. Due to the influence thereof, the influence of the exclusive control carried out on the input part 1503 and the HDD 1506 simultaneously on the delay time, for example, may become not able to be ignored.

Improvement in the processing speed of the input part 1503 and an increase in image quality may be continuously carried out, and thereby, for example, the processing time of the HDD 1506 may become longer than the processing time of the input part 1503. Thereby, the processing time of the HDD 1506 may become a bottleneck, and it may be difficult to satisfy the required specification that requires improvement of the processing speed. Exclusive control according to the second embodiment reduces such a problem.

Figure 18:
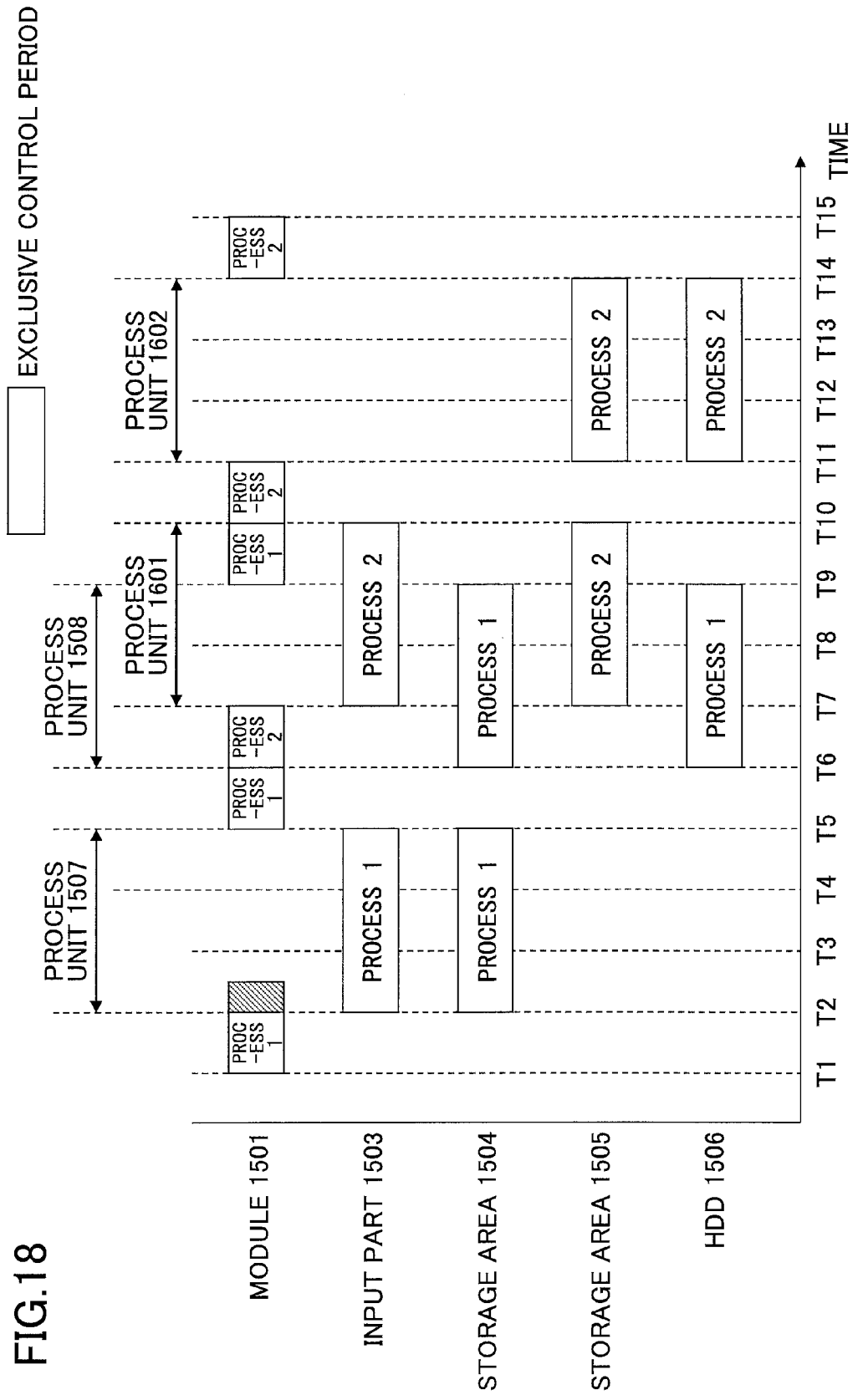
FIG. 18 shows one example of an input process according to the second embodiment.

FIG. 18 shows one example of an input process according to the second embodiment. According to the second embodiment, the storage area is divided into a plurality of storage areas (storage areas 1504 and 1505), and they are managed as respective resources. Further, exclusive control of the process 1 is divided into a process unit 1507 concerning the input part 1503 having a low processing speed and a process unit 1508 concerning the HDD 1506 having a low processing speed. Similarly, exclusive control of the process 2 is divided into a process unit 1601 concerning the input part 1503 having the low processing speed and a process unit 1602 concerning the HDD 1506 having the low processing speed.

At a time T1 in FIG. 18, execution of the process 1 is started. Then, the exclusive control part 303 carries out exclusive control of the module 1501. At this time, a start process in the process 1 is executed including a process of obtaining access rights for the input part 1503 and the storage area 1504 that are the resources to be used in the process unit 1507. Note that, according to the second embodiment, exclusive control of the module 1501 is carried out before exclusive control of the resources themselves, and the module 1501 on which the exclusive control is carried out manages the access rights and so forth, in order to avoid a deadlock.

Next, at a time T2, the exclusive control part 303 carries out exclusive control of the input part 1503 and the storage area 1504 for which the process 1 has the access rights, and finishes (or stops) the exclusive control of the module 1501.

Note that, to carry out exclusive control means to control (lock) a resource or a module as a target(s) of the exclusive control so that it is not to finish or stop exclusive control means to control (remove a lock of) a resource or a module, once controlled (locked) so as not to be able to be used for another process, so as to be able to be used for another process.

Further, an "exclusive control period" in FIG. 18 shows a period of time in which exclusive control is carried out for the process 1 or the process 2. Therefore, for example, in FIG. 18, during a period of time T3-T5, exclusive control is not carried out on the module 1501 for the process 1 or the process 2. That is, FIG. 18 shows that, for example, during the period of time T3-T5, the process 1 or 2 can access the module 1501, and does not show that the module 1501 does not execute the process 1 or 2. Therefore, when the exclusive control part 303 has finished the exclusive control, for example, before a time T3 in FIG. 18, the module 1501 is available to be used for any process at the time T3, for example.

Note that a timing at which the exclusive control part 303 finishes the exclusive control of the module 1501 may be a time before exclusive control of a resource is started, i.e., for example, before a time T2; at the time; or after the time T2.

For example, even in a case where the exclusive control of the module 1501 is continued through a hatched period further after the time T2, the module 1501 is available to be used for another process from, for example, the time T3. Therefore, an advantageous effect of reducing the delay time generated due to exclusive control is expected. That is, the timing at which the exclusive control part 303 finishes the exclusive control of the module 1501 is preferably before finishing the exclusive control of the resources such as the input part 1503, the storage area 1504 and so forth, for example, before the time T5 shown in FIG. 18. Thereby, it is possible to start the process 2 before finishing the exclusive control of the resources concerning the process 1. The same manner can be applied also for the subsequent processes.

Note that, in the example of FIG. 18, the process 2 first uses the input part 1503. Therefore, the process 2 waits until the process 1 releases the input part 1503. However, execution of a process not using the input part 1503 such as a process of outputting image data in the HDD 1506 to the output part 1502 can be started at, for example, the time T3.

When the processes in the process unit 1507 for the process 1 have been finished at the time T5, the exclusive control part 303 finishes the exclusive control of the input part 1503 and the storage area 1504, and carries out exclusive control of the module 1501. Next, a process in the process 1 is executed, for example, a process of releasing the access right for the input part 1503, obtaining the access right for the HDD 1506 to be used in the next process unit 1508 and so forth. Further, the process 1 keeps the access right for the storage area 1504 to be continuously used also in the next process unit 1508. Alternatively, it is also possible that the process 1 newly obtains the access right for the storage area 1504.

Next, at a time T6, the exclusive control part 303 carries out exclusive control of the storage area 1504 and the HDD 1506 (resources) for which the process 1 has the access rights, and finishes the exclusive control of the module 1501.

At the time T6, the module 1501 and the input part 1503 become available, and thus, execution of the process 2 is started. When execution of the process 2 has been thus started at the time T6, the exclusive control part 303 carries out exclusive control of the module 1501. At this time, a start process in the process 2 is executed including a process of obtaining access rights for the input part 1503 and the storage area 1505 to be used in the process unit 1601. Next, at a time T7, the exclusive control part 303 carries out exclusive control on the input part 1503 and the storage area 1505 (resources) for which the process 2 has the access rights, and finishes the exclusive control of the module 1501.

Next, when the processes in the process unit 1508 for the process 1 have been finished at a time T9, the exclusive control part 303 finishes the exclusive control of the storage area 1504 and the HDD 1506, and starts exclusive control of the module 1501. At this time, an end process in the process 1 is executed including, for example, a process of releasing the access rights for the storage area 1504 and the HDD 1506, and so forth. At a time T10, the process 1 is finished, and the exclusive control part 303 finishes the exclusive control of the module 1501 concerning the process 1.

On the other hand, at the time T10, the processes in the process unit 1601 for the process 2 are finished, and therefore, the exclusive control part 303 finishes the exclusive control of the input part 1503 and the storage area 1505, and carries out exclusive control of the module 1501. At this time, a process in the process 2 is executed, for example, a process of releasing the access right for the input part 1503, and obtaining the access right for the HDD 1506 to be used in the next process unit 1602. Further, the process 2, for example, keeps the access right for the storage area 1505 to be continuously used also in the next process unit 1602.

Next, at a time T11, the exclusive control part 303 carries out exclusive control of the storage area 1505 and the HDD 1506 for which the process 2 has the access rights, and finishes the exclusive control of the module 1501.

When the processes in the process unit 1602 for the process 2 have been finished at the time T14, the exclusive control part 303 finishes the exclusive control of the storage area 1505 and the HDD 1506, and carries out exclusive control of the module 1501. At this time, an end process in the process 2 is executed including, for example, a process of releasing the access rights for the storage area 1505 and the HDD 1506, and so forth. At a time T15, the processes concerning the process 2 are finished, and the exclusive control part 303 finishes the exclusive control of the module 1501 concerning the process 2.

Thus, according to the second embodiment, exclusive control is divided (subdivided) into a plurality of process units based on the processing speeds of a plurality of resources. Thereby, exclusive control can be prevented from being carried out on two resources simultaneously having relatively low processing speeds. Further, it is possible to effectively reduce a delay in a process caused by exclusive control without unnecessarily subdividing exclusive control.

Third Embodiment

According to the third embodiment, a plurality of resources include two or more predetermined processes that are in linkage with each other, and the predetermined processes are included in a single process unit of exclusive control.

Figure 19:
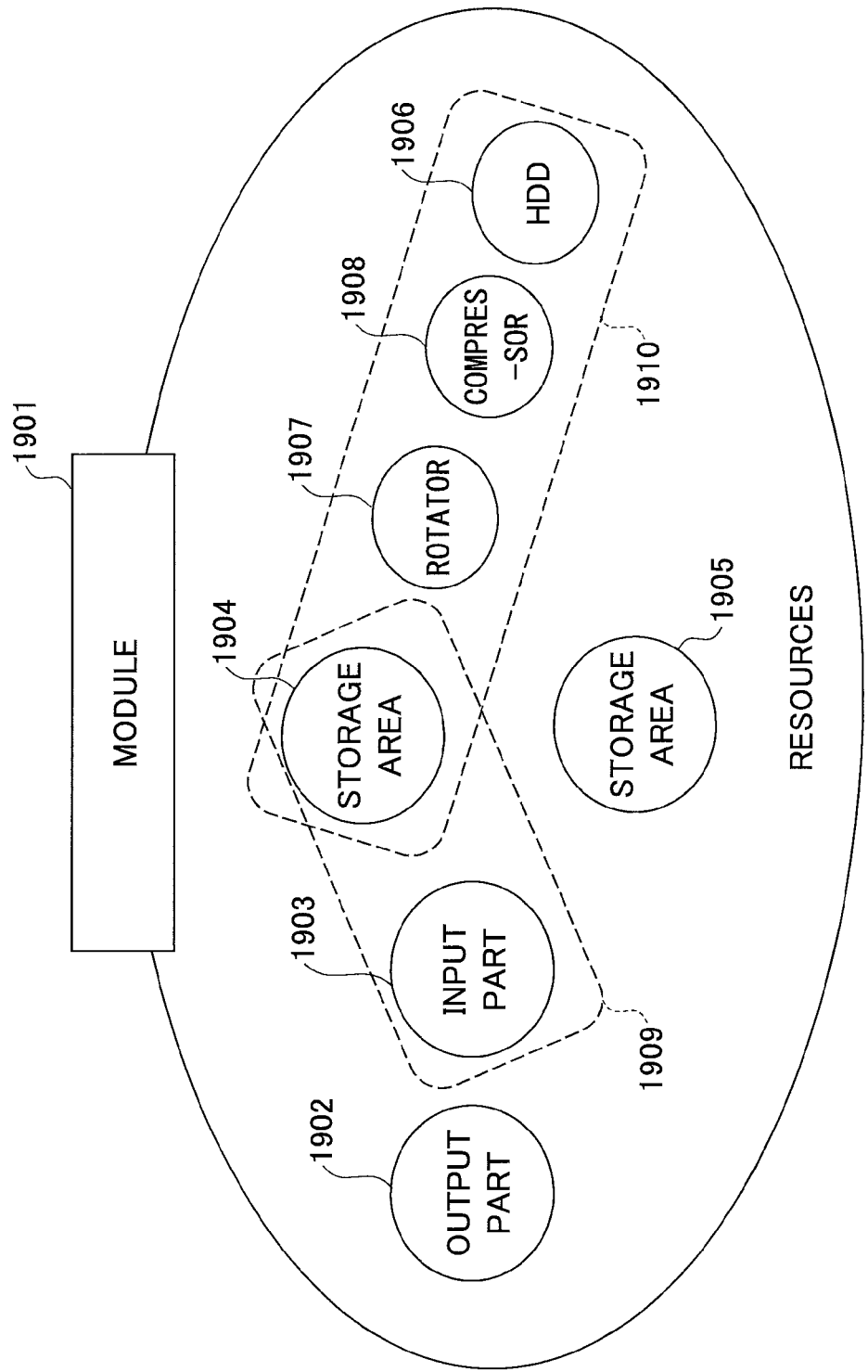
FIG. 19 shows process units concerning exclusive control for a process 1 according to the third embodiment.

FIG. 19 shows process units of exclusive control for a process 1. A module 1901 includes a plurality of resources such as an output part 1902, an input part 1903, a plurality of the storage areas 1904 and 1905 storing image data, a rotator 1907, a compressor 1908, a HDD 1906 and so forth.

Thereamong, the output part 1902, the input part 1903, the plurality of the storage areas 1904 and 1905 and the HDD 1906 are the same as those in the second embodiment shown in FIG. 15. The rotator 1907 is an image processing part for rotating image data by rearranging the data, or the like (for example, rotation by 90 degrees, by 270 degrees, or the like), and is implemented by a digital circuit included in the ASIC 206 prepared for image processing shown in FIG. 2, or the like, for example. The compressor 1908 is an image processing part for compressing image data, and is implemented by a digital circuit included in the ASIC 206 prepared for image processing shown in FIG. 2, or the like, for example.

According to the third embodiment, it is assumed that the rotator 1907 and compressor 1908 are in linkage with the HDD 1906, and are capable of carrying out processes of rotating and compressing image data, and storing the image data in the HDD 1506. In such a case, for example, when exclusive control of the rotator 1907, the compressor 1908 and the HDD 1906 that are capable of carrying out such processes in linkage with each other is subdivided, the processing efficiency (speed) may be degraded. In such a case, it is advantageous to include the rotator 1907, the compressor 1908 and the HDD 1906 that are capable of carrying out processes in linkage with each other in a single process unit of exclusive control.

For example, in FIG. 19, it is assumed that the process 1 is an input process of storing image data read through the input part 1903 in the storage area 1904, rotating and compressing the image data stored in the storage area 1904, and storing the image data in the HDD 1906. According to the third embodiment, exclusive control concerning the process 1 is divided into two process units, i.e., a process unit 1909 concerning the input part 1903 and a process unit 1910 concerning the rotator 1907, the compressor 1908 and the HDD 1906, and the exclusive control is carried out in this manner.

Figure 20:
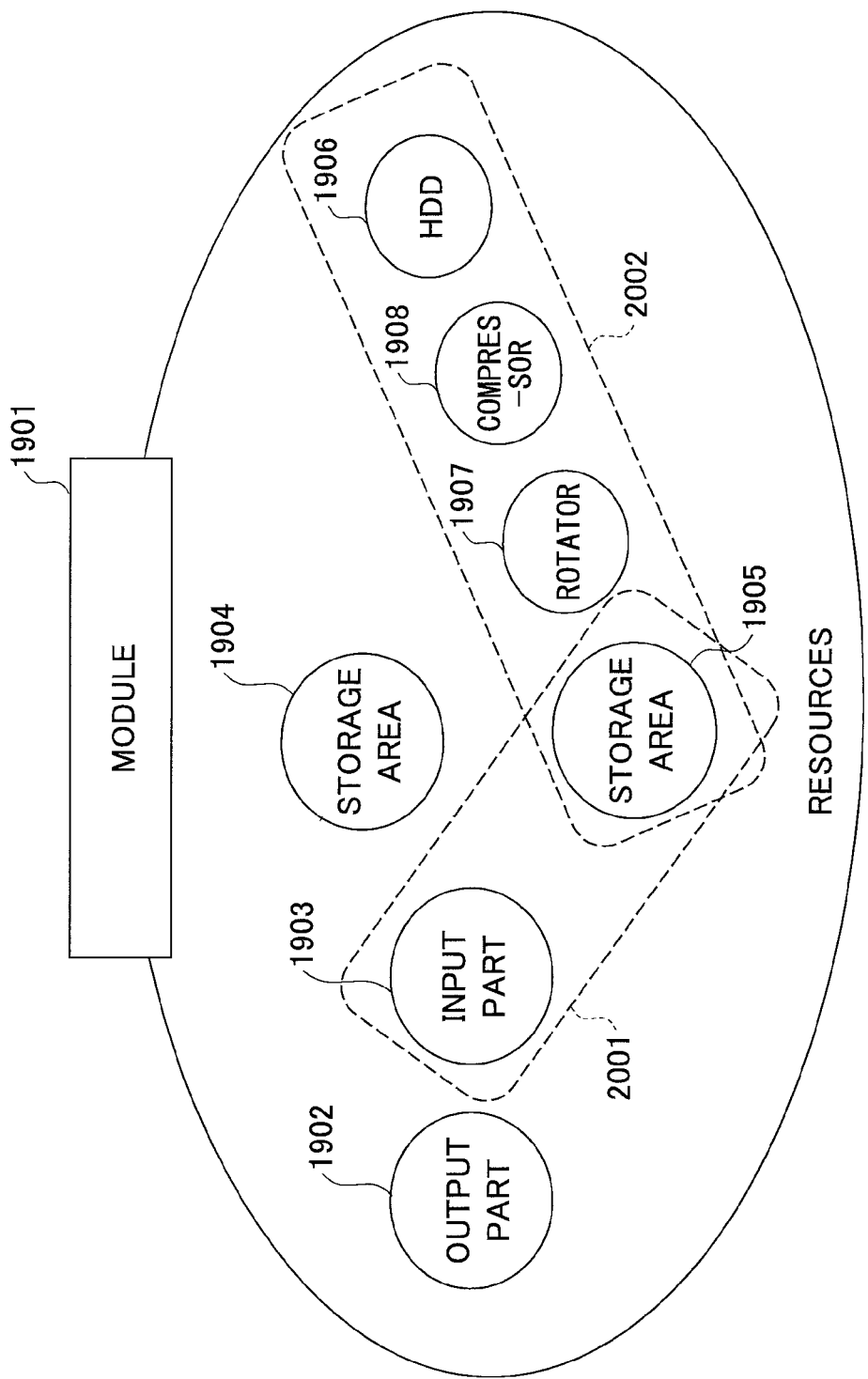
FIG. 20 shows process units concerning exclusive control for a process 2 according to the third embodiment.

FIG. 20 shows process units of exclusive control for a process 2. According to the third embodiment, it is assumed that the process 2 is an input process of storing image data read through the input part 1903 in the storage area 1905, rotating and compressing the image data stored in the storage area 1905, and storing the image data in the HDD 1906. According to the third embodiment, exclusive control concerning the process 2 is divided into two process units, i.e., a process unit 2001 concerning the input part 1903 and a process unit 2002 concerning the rotator 1907, the compressor 1908 and the HDD 1906, and the exclusive control is carried out in this manner.

Figure 21:
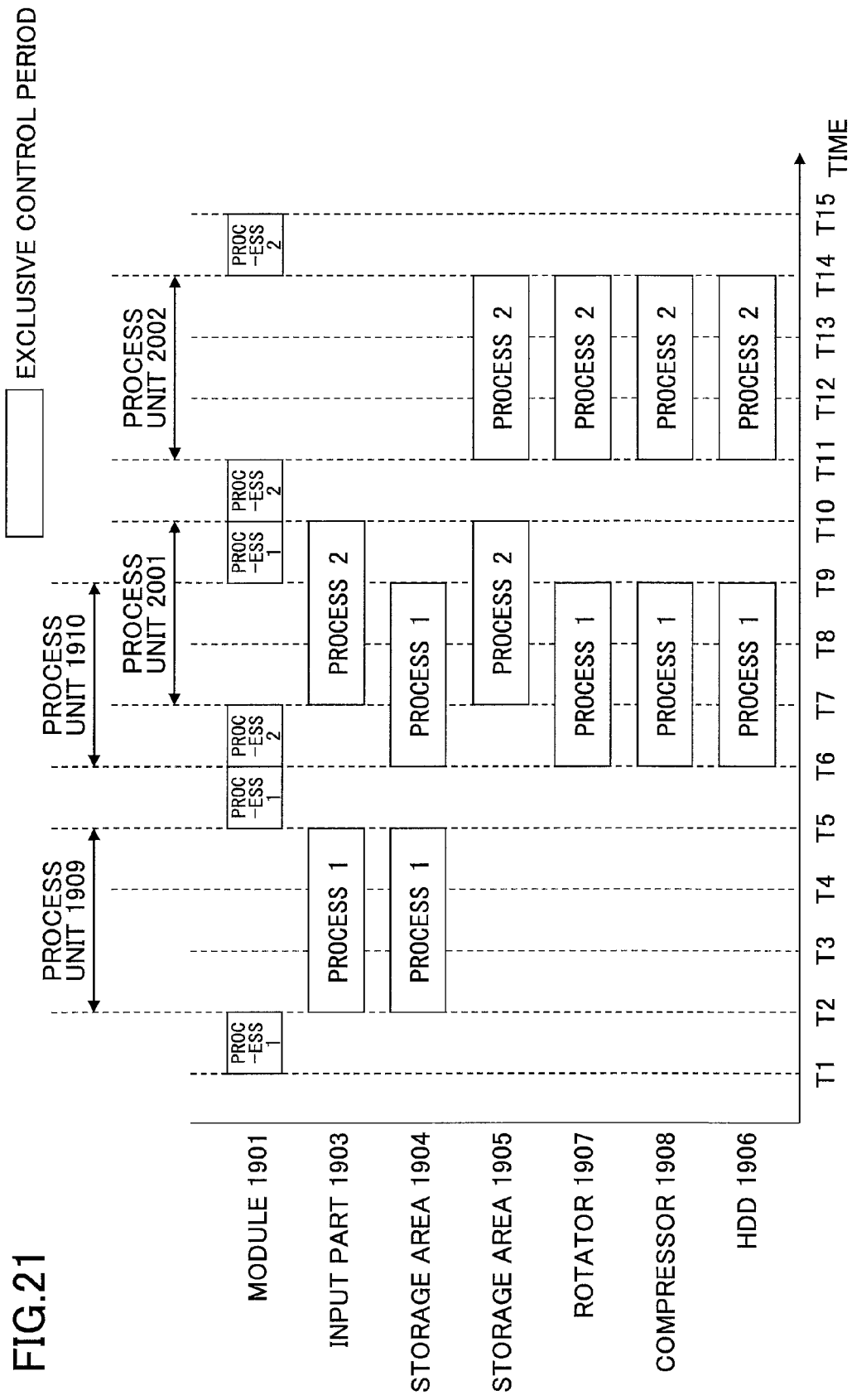
FIG. 21 shows one example of an input process according to the third embodiment.

FIG. 21 shows one example of an input process according to the third embodiment. FIG. 21 shows an example for a case where the processing speeds of the rotator 1907 and the compressor 1908 are sufficiently higher than that of the HDD 1906, and the input process is carried out in the same timing as that of FIG. 18. Note that a flow of exclusive control is the same as FIG. 18, and thus, duplicate description is omitted.

Thus, in such a case where a plurality of resources include two or more predetermined processes that can be carried out in linkage with each other, it is possible to improve the processing efficiency by including the two or more predetermined processes that can be carried out in linkage with each other in a single process unit of exclusive control. For example, it is preferable to carry out exclusive control of hardware resources implemented in an ASIC in appropriate process units according to the specification of the ASIC.

Further, by carrying out exclusive control in such a manner, it is possible to effectively reduce a delay in a process caused by exclusive control without unnecessarily subdividing exclusive control into process units.

Fourth Embodiment

According to a fourth embodiment, a case will be described where a plurality of resources, for example, an input part, an output part, a rotator, a compressor, a HDD and so forth have a plurality of execution units.

Figure 22:
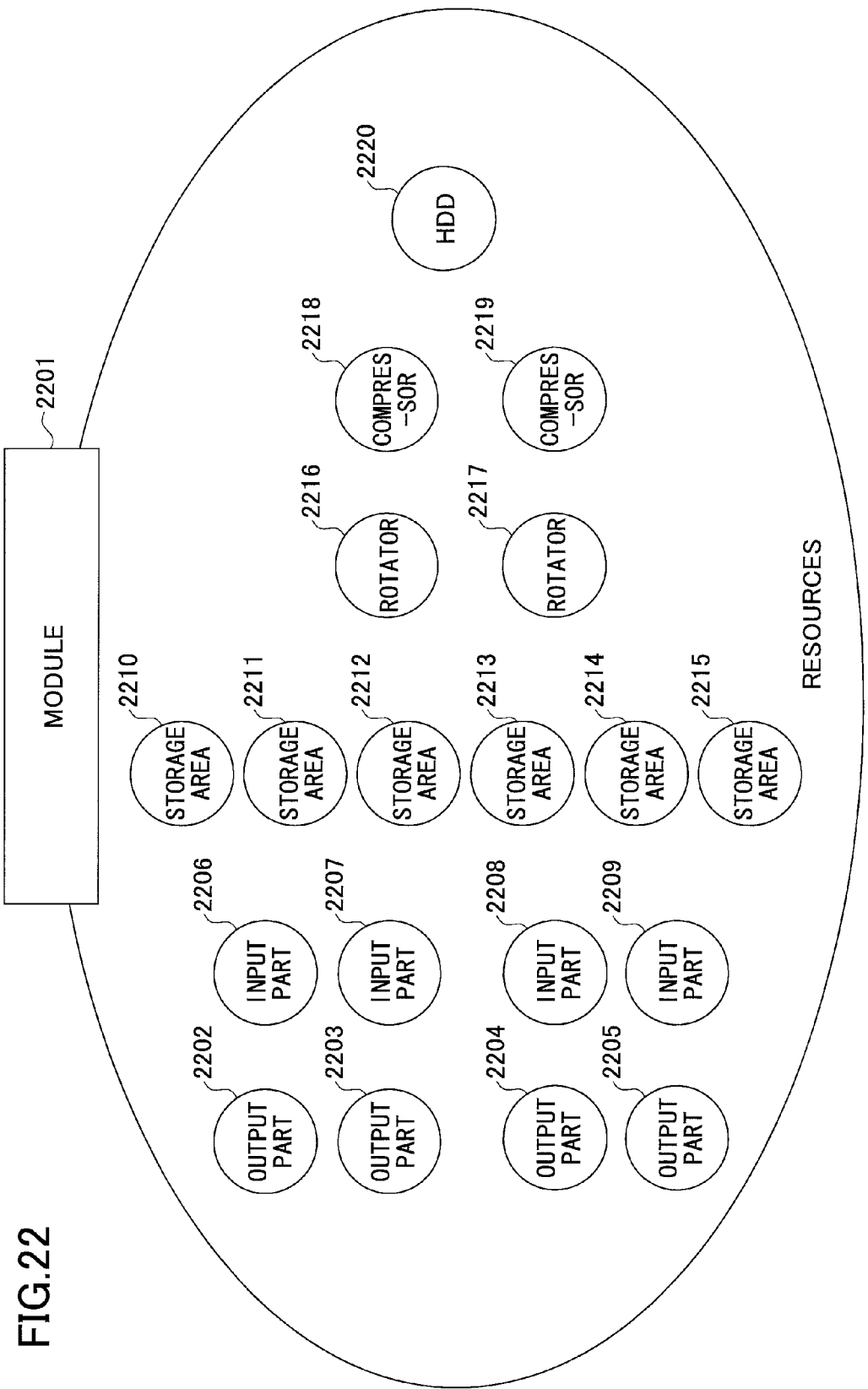
FIG. 22 shows a configuration of resources according to the fourth embodiment.

FIG. 22 shows a plurality of resources according to the fourth embodiment. A module 2201 includes four output parts 2202, 2203, 2204 and 2205, four input parts 2206, 2207, 2208 and 2209, six storage areas 2210, 2211, 2212, 2213, 2214 and 2215, two rotators 2216 and 2217, two compressors 2218 and 2219 and a single HDD 2220.

The output parts 2202, 2203, 2204 and 2205 are four execution units of an output section. The input parts 2206, 2207, 2208 and 2209 are four execution units of an input section. The input section and the output section can process, in parallel, respective sets of image data in four colors included in a color image in a Cyan Magenta Yellow Key plate color model (CMYK) form, i.e., Cyan (C), Magenta (M), Yellow (Y) and Black (K), using the four execution units in the input section and the four execution units in the output section.

Also as to the rotators and the compressors, it is preferable that each has four execution units from a viewpoint of the processing speed. However, according to the fourth embodiment, for the reason of, for example, the cost, implementation, and/or the like, a rotator section has the two execution units (rotators 2216 and 2217) and a compressor section has two execution units (compressors 2218 and 2219), for example.

Figure 23:
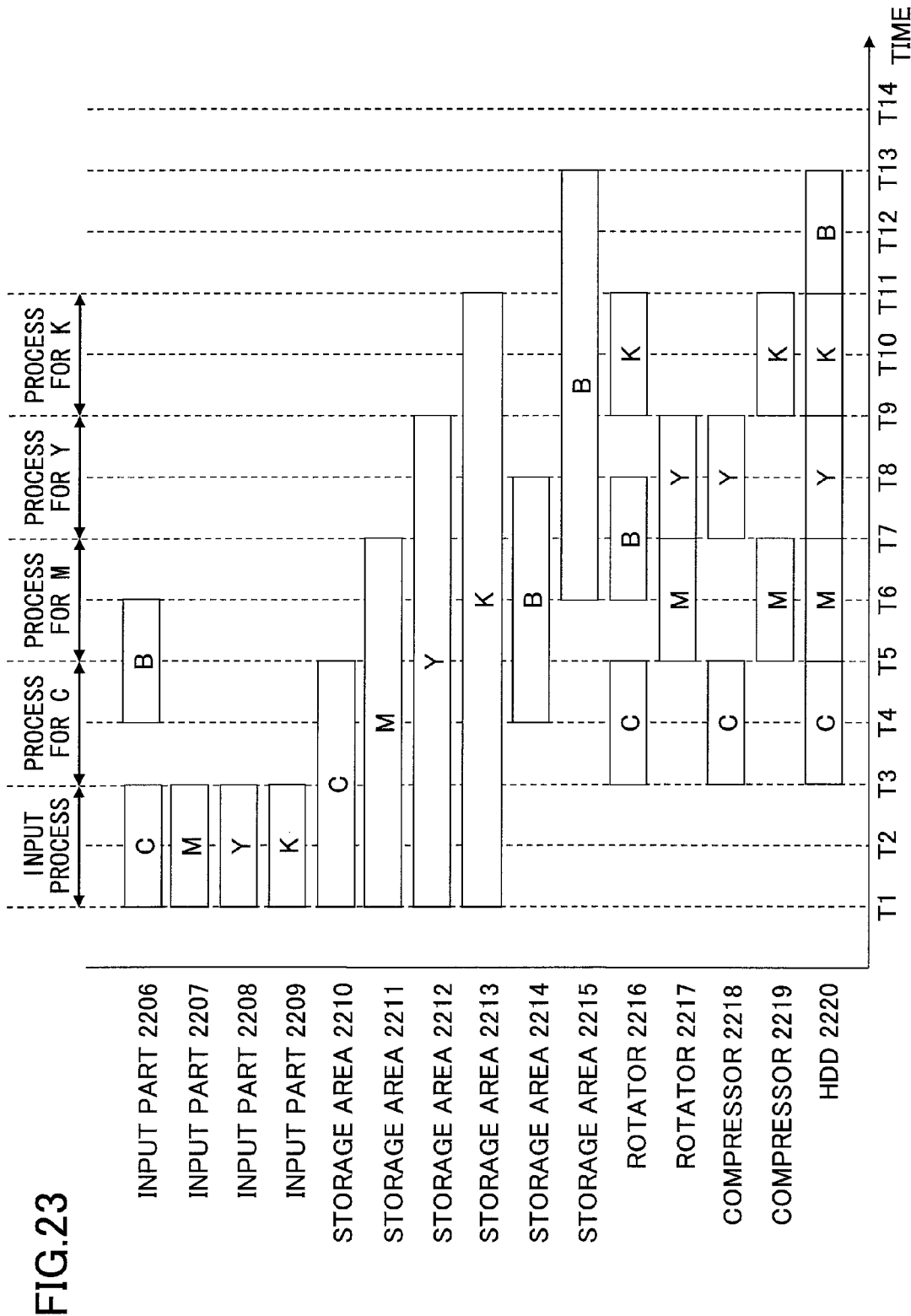
FIG. 23 shows one example of processes according to the fourth embodiment.

FIG. 23 shows one example of a process according to the fourth embodiment. FIG. 23 shows an example of a process of inputting a color image (CMYK image) from the input parts 2206-2209, storing the color image in the storage areas 2210-2213, respectively, rotating and compressing the color image and storing the color image in the HDD 2220. Note that also in the fourth embodiment, exclusive control of the module 2201 is carried out before and after exclusive control of the respective resources. However, explanation of exclusive control of the module 2201 is omitted in FIGS. 23 and 24 since it is the same as in the second and third embodiments described above.

According to the fourth embodiment, the input parts 2206, 2207, 2208 and 2209, the storage areas 2210, 2211, 2212, 2213, 2214 and 2215, the rotators 2216 and 2217, the compressors 2218 and 2219, and the HDD 2220 are managed as respective resources. Further, the exclusive control part 303 subdivides exclusive control into process units based on the number of resources that can execute respective processes simultaneously.

<Flow of Processing>

At a time T1 in FIG. 23, the exclusive control part 303 carries out exclusive control of the input parts 2206-2209 and the storage areas 2210-2213. In such a case where the resources required for a process can be obtained at once, it is preferable that the number of process units of exclusive control is one accordingly.

The input part 2206 obtains the data of the C component of the CMYK image, and stores it in the storage area 2210, in an input process. Similarly, the input parts 2207, 2208 and 2209 store respective sets of the M component, the Y component and the K component of the CMYK image in the storage areas 2211, 2212 and 2213. When the input process is thus finished at a time T3, the exclusive control part 303 finishes the exclusive control of the input parts 2206-2209 and the storage areas 2210-2213.

Next, a process of rotating, compressing and storing the respective sets of data of the C, M, Y and K components thus stored in the storage areas 2210, 2211, 2212 and 2213 in the HDD 2220 is executed, respectively, after the time T3. However, the image forming apparatus 100 according to the fourth embodiment has only the two execution units in the rotator section, the two execution units in the compressor section, and the single HDD 2220. Therefore, it is not possible to process the four sets of data of the C, M, Y and K components simultaneously.

Therefore, for example, in a case where the storage area, the rotator, the compressor and the HDD execute respective processes in linkage with each other as in the third embodiment, the process of rotating, compressing and storing the four sets of data of the C, M, Y and K components is executed in four separate times based on the number "1" of the HDD 2220 that is the smallest number of the execution units. In this case, also exclusive control thereof is preferably divided into four process units to correspond to the four separate times in which the process of rotating, compressing and storing the four sets of data of the C, M, Y and K components is executed.

Further, if the number of resources each having the function of a HDD is two, it is possible to carry out the process of rotating, compressing and storing the four sets of data of the C, M, Y and K components in two separate times, two colors each. In this case, it is advantageous to similarly divide exclusive control thereof into two process units.

Note that even if the number of resources each having the function of a HDD is four, the number of resources each having the function of each of a rotator and a compressor is only two. Therefore, in such a case, the process of rotating, compressing and storing the four sets of data of the C, M, Y and K components is carried out in two separate times, two colors each. In this case, exclusive control thereof is similarly divided into two process units.

In such a case where it is not possible to obtain resources required for a process at once, and the process is executed in a plurality of separate times according to the number of execution units, it is preferable that exclusive control thereof is similarly divided to correspond to the number of separate times in which the process is executed.

Returning to FIG. 23, explanation of the example of the process will now be proceeded with. The exclusive control part 303 carries out exclusive control of the storage areas 2210, the rotator 2216, the compressor 2218 and the HDD 2220 at a period of time T3-T5. During the period, the image forming apparatus 100 carries out a process of rotating, compressing and storing the data of the C component. Note that at this time, it is preferable to carry out exclusive control of also the storage areas 2211, 2212 and 2213 storing the respective sets of data of the M, Y and K components waiting to be processed, and thus, protect these sets of data.

When the process of rotating, compressing and storing the data of the C component has been finished at the time T5, the exclusive control part 303 finishes the exclusive control of the storage area 2210, the rotator 2216, the compressor 2218 and the HDD 2220.

Next, in a period of time T5-T7, the exclusive control part 303 carries out exclusive control of the storage areas 2211, the rotator 2217, the compressor 2219 and the HDD 2220. During the period, the image forming apparatus 100 carries out a process of rotating, compressing and storing the data of the M component. At this time, it is preferable to carry out exclusive control of also the storage areas 2212 and 2213 storing the respective sets of data of the Y and K components waiting to be processed, and thus, protect these sets of data.

When the process of rotating, compressing and storing the data of the M component has been finished at the time T7, the exclusive control part 303 finishes the exclusive control of the storage area 2211, the rotator 2217, the compressor 2219 and the HDD 2220.

Note that, by thus subdividing the exclusive control into the process units to correspond to the processes concerning the respective colors, it is possible to start another process, for example, an input process of inputting a monochrome image B at the time T4, for example. In this case, it is assumed that the input process of inputting the monochrome image B includes, for example, a process of storing monochrome image data that is input through the input part 2206 in the storage area 2214, rotating the stored monochrome image data using the rotator 2216 that is not used at the time T6, and storing the image data in the storage area 2215.

Next, in a period of time T7-T9 in FIG. 23, the exclusive control part 303 carries out exclusive control of the storage areas 2212, the rotator 2217, the compressor 2218 and the HDD 2220. During the period, the image forming apparatus 100 carries out a process of rotating, compressing and storing the data of the Y component. At this time, it is preferable to carry out exclusive control of also the storage area 2213 storing the data of the K component waiting to be processed, and thus, protect the data.

When the process of rotating, compressing and storing the data of the Y component has been finished at the time T9, the exclusive control part 303 finishes the exclusive control of the storage area 2212, the rotator 2217, the compressor 2218 and the HDD 2220.

Similarly, in a period of time T9-111 in FIG. 23, the exclusive control part 303 carries out exclusive control of the storage area 2213, the rotator 2216, the compressor 2219 and the HDD 2220. During the period, the image forming apparatus 100 carries out a process of rotating, compressing and storing the data of the K component.

When the process of rotating, compressing and storing the data of the K component has been finished at the time T11, the exclusive control part 303 finishes the exclusive control of the storage area 2213, the rotator 2216, the compressor 2219 and the HDD 2220.

When the processes of rotating, compressing and storing the respective sets of the C, M, Y, K components have been finished at the time T11, it becomes possible to store the image data obtained from rotating the monochrome image B and stored in the storage area 2215, in the input process started at the time T4, then in the HDD 2220, for example.

Figure 24:
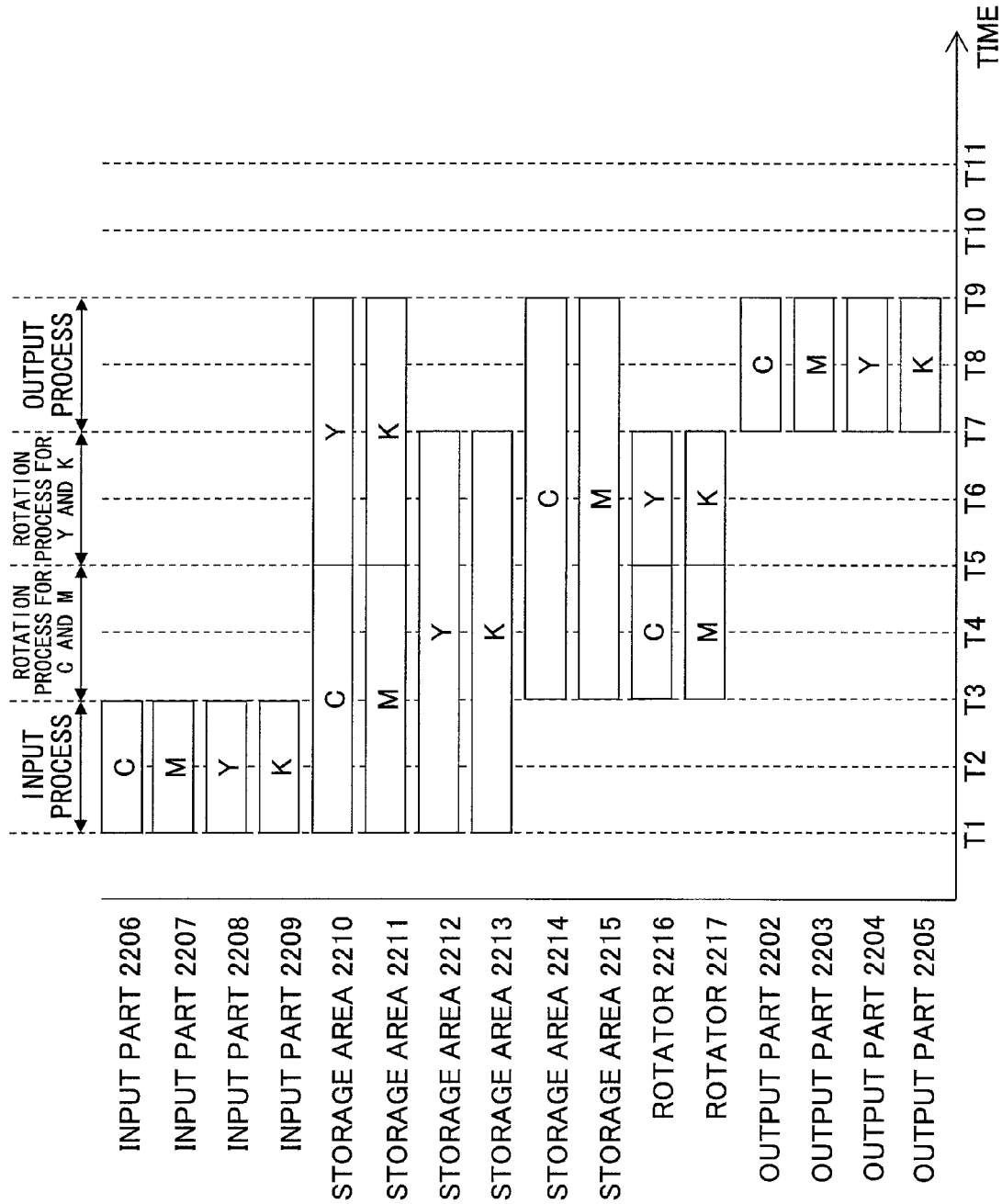
FIG. 24 shows another example of processes according to the fourth embodiment.

FIG. 24 shows another example of a process according to the fourth embodiment. FIG. 24 shows an example of a process of inputting a color image (CMYK image) through the input parts 2206-2209, storing it in the storage areas 2210-2213, carrying out a rotation process on the stored color image, and outputting it to the output parts 2202-2206.

Also in the example of FIG. 24, the input part 2206, 2207, 2208 and 2209, the storage areas 2210, 2211, 2212 and 2213, the rotators 2216 and 2217, and the output parts 2202, 2203, 2204 and 2205 are managed as respective resources, and exclusive control for the process is subdivided into process units based on the number of resources that can be used simultaneously to execute the process.

At a time T1 in FIG. 24, the exclusive control part 303 carries out exclusive control of the input parts 2206-2209 and the storage areas 2210-2213. Thus, it is preferable not to divide exclusive control for a process for which the necessary resources can be obtained at once.

The input part 2206, in an input process, obtains the data of the C component of the CMYK image, and stores it in the storage area 2210. Similarly, the input parts 2207, 2208 and 2209 obtain the respective sets of data of the M component, the Y component and the K component of the CMYK image, and store them in the storage areas 2211, 2212 and 2213, respectively. When the input process has been finished at a time T3, the exclusive control part 303 finishes the exclusive control of the input parts 2206-2209.

Next, at a time of a time T3 or later, a process of rotating the respective sets of data of the C, M, Y and K components, stored in the storage areas 2210, 2211, 2212 and 2213, respectively, and outputting the thus processed sets of data to the output parts 2202-2205, respectively, is executed. However, since the image forming apparatus 100 according to the fourth embodiment has only the two execution units of the rotators 2216 and 2217, it is not possible to process the four sets of data of the C, M, Y and K components, at once.

Therefore, according to the fourth embodiment, the process of rotating the respective sets of data of the C, M, Y and K components is executed in two separate times according to the smallest number "2" of the execution units, i.e., the rotators 2216 and 2217. In this case, it is preferable to also divide exclusive control into two process units to correspond to the two separate times in which the process of rotating the respective sets of data of the C, M, Y and K components is executed.

Note that, according to the fourth embodiment, the number of execution units in the output section is four, and it is possible to output the respective sets of data of the C, M, Y and K components at once. Therefore, it is preferable to divide exclusive control into respective process units for the output section and the rotation process.

Returning to FIG. 24, the explanation of the example of the process will be continued. In a period of time T3-T5, the exclusive control part 303 carries out exclusive control of the storage areas 2210, 2211, 2214 and 2215 and the rotators 2216 and 2217. The rotator 2216 carries out a rotation process on the data of the C component of the CMYK image stored in the storage area 2210, and stores the processed data in the storage area 2214. Similarly, the rotator 2217 carries out a rotation process on the data of the M component of the CMYK image stored in the storage area 2211, and stores the processed data in the storage area 2215. Note that, at this time, it is preferable to carry out exclusive control of the storage areas 2212 and 2213 storing the respective sets of data of the Y and K components waiting for being processed, and protect these sets of data.

When the rotation processes on the respective sets of data of the C and M components have been finished at the time T5, the exclusive control part 303 finishes the exclusive control of the storage areas 2210, 2211, 2214 and 2215 and the rotators 2216 and 2217. Note that, by thus finishing the exclusive control, it becomes possible to again use the storage areas 2210 and 2211.

Next, in a period of time T5-T7, the exclusive control part 303 carries out exclusive control of the storage areas 2210, 2211, 2212 and 2213 and the rotators 2216 and 2217. The rotator 2216 carries out a rotation process on the data of the Y component of the CMYK image stored in the storage area 2212, and stores the processed data in the storage area 2210. Similarly, the rotator 2217 carries out a rotation process on the data of the K component of the CMYK image stored in the storage area 2213, and stores the processed data in the storage area 2211.

When the rotation processes on the respective sets of data of the Y and K components have been finished at the time T7, the exclusive control part 303 finishes the exclusive control of the storage areas 2210, 2211, 2212 and 2213 and the rotators 2216 and 2217.

Next, in a period of time T7-T9, the exclusive control part 303 carries out exclusive control of the storage areas 2210, 2211, 2214 and 2215 and the output part 2202, 2203, 2204 and 2205. The output parts 2202, 2203, 2204 and 2205 carry out output processes (for example, color printing) on the respective sets of data of the CMYK image stored in the storage areas 2210, 2211, 2214 and 2215.

When the output processes have been finished at the time T9, the exclusive control part 303 finishes the exclusive control of the storage areas 2210, 2211, 2214 and 2215 and the output parts 2202, 2203, 2204 and 2205.

Thus, according to the fourth embodiment, in a case where a plurality of resources includes a plurality of execution units that can carry out equivalent functions in parallel, exclusive control is subdivided into process units based on the number of the plurality of execution units in the plurality of resources. Thereby, some of the plurality of execution units that cannot be used simultaneously are available to be used by another process. Further, it is possible to effectively reduce a delay in a process caused by exclusive control without unnecessarily subdividing exclusive control.

Summary of Embodiments

Thus, according to the embodiments, the image forming apparatus 100 manages, as a plurality of resources, image data used by a plurality of processes concerning a module of the image forming apparatus 100 or a storage area(s) storing the image data, and one or more units of hardware. Further, in a case where at least one resource of the plurality of resources is used, exclusive control is carried out on the at least one resource to be used, and exclusive control of the module is finished.

By the above-mentioned operations, while a process concerning the module uses a resource(s), the module is available to be used for starting another process. As a result, it is possible to reduce a delay caused by exclusive control.

Further, in a case where at least one of a plurality of resources is used, the exclusive control part 303 carries out exclusive control of a module before exclusive control of the resource(s). Since exclusive control is carried out on the module that manages an access right for the resource(s) or the like before exclusive control of the resource(s), it is possible to avoid a deadlock.

Further, the exclusive control part 303 finishes exclusive control of a module before finishing exclusive control of a resource(s). Thereby, it is possible to start another process before the exclusive control of the resource(s) is finished.

Further, in the image forming apparatus 100, exclusive control concerning a plurality of processes of a module is subdivided into a plurality of process units based a plurality of resources. By thus subdividing exclusive control into a plurality of process units, it is possible to finish exclusive control of a resource(s) (release the resource(s)) not being used.

As one preferred example, it is advantageous to subdivide exclusive control concerning a plurality of processes of a module into a plurality of process units based on the processing speeds of a plurality of resources. Thereby, it is possible to prevent exclusive control from being carried out on a plurality of resources simultaneously that have low processing speeds. Further, it is possible to effectively reduce a delay in a process caused by exclusive control without unnecessarily subdividing exclusive control.

Further, in a case where a plurality of resources include two or more resources that carry out predetermined processes in linkage with each other, it is advantageous to include the predetermined processes in a single process unit of exclusive control. Thereby, it is possible that the two or more resources that operate in linkage with each other can operate efficiently. Further, it is possible to effectively reduce a delay in a process caused by exclusive control without unnecessarily subdividing exclusive control.

As another preferred example, in a case where the above-mentioned plurality of resources include a plurality of execution units that can execute equivalent processes in parallel, it is advantageous to subdivide exclusive control concerning processes of the module based on the number of the execution units. Thereby, some of the plurality of execution units that cannot be used simultaneously for one process can be effectively used for another process. Further, it is possible to effectively reduce a delay in a process caused by exclusive control without unnecessarily subdividing the exclusive control.

The image forming apparatuses and the methods of controlling the same have been described in the embodiments. However, the present invention is not limited to the specifically disclosed embodiments, and variations and modifications may be made without departing from the scope of the present invention.

The present application is based on and claims the benefit of priority of Japanese Priority Application No. 2013-042264, dated Mar. 4, 2013, and Japanese Priority Application No. 2013-245561, dated Nov. 28, 2013, the entire contents of which are hereby incorporated herein by reference.

What is claimed is:

1. An image forming apparatus comprising:
    a resource management part to manage, as a plurality of resources, image data to be used by a plurality of processes concerning a module in the image forming apparatus or a storage area that stores the image data, and one or more units of hardware; and
    an exclusive control part to, in a case where at least one resource of the plurality of resources is used, carry out exclusive control of the at least one resource, and to stop or finish exclusive control of the module, the exclusive control concerning one process of the plurality of processes being subdivided into a plurality of process units based on the plurality of resources, and the subdividing being based on processing speeds of the storage area and the one or more units of hardware included in the plurality of resources.

2. The image forming apparatus as claimed in claim 1, wherein
    the exclusive control part carries out the exclusive control of the module before carrying out the exclusive control of the at least one resource.

3. The image forming apparatus as claimed in claim 1, wherein
    the exclusive control part stops or finishes the executive control of the module before stopping or finishing the exclusive control of the at least one resource.

4. The image forming apparatus as claimed in claim 1, wherein
    the plurality of resources include two or more resources that carry out a predetermined process in linkage with one another, and
    the predetermined process is included in one process unit of the plurality of process units.

5. The image forming apparatus as claimed in claim 1, wherein
    the plurality of resources include plurality of execution units that are capable of carrying out equivalent processes in parallel, and
    the exclusive control concerning the one process is subdivided according to the number of the plurality of execution units.

6. The image forming apparatus as claimed in claim 1, wherein
    the at least one resource includes a plurality of sub-resources obtained from subdividing the at least one resource, and
    when at least one of the plurality of sub-resources is used, the exclusive control of the at least one resource is stopped or finished.

7. The image forming apparatus as claimed in claim 1, further comprising:
    a plurality of storage areas managed as resources included in the plurality of resources.

8. The image forming apparatus as claimed in claim 1, wherein
the resource management part manages at least one of software resources that implements a predetermined function, as at least one resource included in the plurality of resources.

9. The image forming apparatus as claimed in claim 1, wherein
the resource management part manages, as a single resource, more than one of the plurality of resources.

10. A method of controlling an image forming apparatus, comprising:
managing, by one or more processors, as a plurality of resources, image data to be used by a plurality of processes concerning a module in the image forming apparatus or a storage area that stores the image data, and one or more units of hardware; and
carrying out by the one or more processors, in a case where at least one resource of the plurality of resources is used, exclusive control of the at least one resource, and stopping or finishing exclusive control of the module, the exclusive control concerning one process of the plurality of processes being subdivided into a plurality of process units based on the plurality of resources, and the subdividing being based on processing speeds of the storage area and the one or more units of hardware included in the plurality of resources.

11. The method as claimed in claim 10, wherein
the plurality of resources include two or more resources that carry out a predetermined process in linkage with one another, and
the predetermined process is included in one process unit of the plurality of process units.

12. The method as claimed in claim 10, wherein
the at least one resource includes a plurality of sub-resources obtained from subdividing the at least one resource, and
when at least one of the plurality of sub-resources is used, the exclusive control of the at least one resource is stopped or finished.

\* \* \* \* \*

UNITED STATES PATENT AND TRADEMARK OFFICE
CERTIFICATE OF CORRECTION

| | | |
|---|---|---|
| PATENT NO. | : 9,036,193 B2 | Page 1 of 1 |
| APPLICATION NO. | : 14/161810 | |
| DATED | : May 19, 2015 | |
| INVENTOR(S) | : Yuuta Saitoh et al. | |

It is certified that error appears in the above-identified patent and that said Letters Patent is hereby corrected as shown below:

Title Page, Item (30) should read

Foreign Application Priority Data

(30)  March 4, 2013   (JP).................................2013-042264
       November 28, 2013   (JP)...............................2013-245561

Signed and Sealed this
Eighth Day of March, 2016

Michelle K. Lee
*Director of the United States Patent and Trademark Office*